(12) United States Patent
Kawashita et al.

(10) Patent No.: US 11,078,803 B2
(45) Date of Patent: Aug. 3, 2021

(54) AXIAL FLOW ROTATING MACHINERY

(71) Applicant: MITSUBISHI HEAVY INDUSTRIES, LTD., Tokyo (JP)

(72) Inventors: Rimpei Kawashita, Tokyo (JP); Makoto Iwasaki, Tokyo (JP); Makoto Kamishita, Tokyo (JP); Kazuyuki Matsumoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 18 days.

(21) Appl. No.: 16/634,430

(22) PCT Filed: Jan. 29, 2019

(86) PCT No.: PCT/JP2019/002908
§ 371 (c)(1),
(2) Date: Jan. 27, 2020

(87) PCT Pub. No.: WO2019/151221
PCT Pub. Date: Aug. 8, 2019

(65) Prior Publication Data
US 2020/0165927 A1 May 28, 2020

(30) Foreign Application Priority Data
Jan. 31, 2018 (JP) .............................. JP2018-014884

(51) Int. Cl.
*F01D 11/02* (2006.01)
*F01D 11/08* (2006.01)
(Continued)

(52) U.S. Cl.
CPC .............. *F01D 11/02* (2013.01); *F01D 11/08* (2013.01); *F02C 7/28* (2013.01); *F16J 15/447* (2013.01)

(58) Field of Classification Search
CPC ... F01D 11/02; F01D 11/08; F02C 7/28; F16J 15/447; F16J 15/4472; F05D 2240/126
See application file for complete search history.

(56) References Cited

U.S. PATENT DOCUMENTS 4,420,161 A 12/1983 Miller
5,190,440 A * 3/1993 Maier ..................... F01D 11/02
277/412
(Continued)

FOREIGN PATENT DOCUMENTS

JP 2007-120476 5/2007
JP 2011-141015 7/2011
(Continued)

OTHER PUBLICATIONS

International Search Report dated Apr. 16, 2019 in International (PCT) Application No. PCT/JP2019/002908, with English translation.
(Continued)

*Primary Examiner* — Igor Kershteyn
(74) *Attorney, Agent, or Firm* — Wenderoth, Lind & Ponack, L.L.P.

(57) ABSTRACT

An axial flow rotating machinery includes: a rotor; a casing; a rotating-blade stage including rotating blades and a radially-outer side rotating blade ring continuing to radially outer ends of the rotating blades; and a rotating-blade side seal device configured to seal a gap between the radially-outer side rotating blade ring and the casing. The rotating-blade side seal device includes: a seal fin having an annular shape and extending toward an outer peripheral surface of the radially-outer side rotating blade ring from the casing; and a swirl brake fixed to the casing in a cavity formed at an upstream side of the seal fin. The swirl brake includes: a first plate-shaped member having a surface along a radial direc-
(Continued)

tion of the rotor; and a second plate-shaped member or a third plate-shaped member having a surface oblique to the radial direction of the rotor.

11 Claims, 11 Drawing Sheets

(51) Int. Cl.
*F02C 7/28* (2006.01)
*F16J 15/447* (2006.01)

(56) References Cited

U.S. PATENT DOCUMENTS

| | | | |
|---|---|---|---|
| 5,439,347 A | 8/1995 | Brandon | |
| 9,200,528 B2* | 12/2015 | Zheng | F01D 11/02 |
| 2006/0237914 A1* | 10/2006 | Li | F01D 11/001 |
| | | | 277/415 |
| 2007/0257444 A1* | 11/2007 | Childs | F01D 11/08 |
| | | | 277/412 |
| 2008/0181762 A1* | 7/2008 | Ganelin | F04D 29/0513 |
| | | | 415/1 |
| 2013/0017072 A1* | 1/2013 | Ali | F01D 5/225 |
| | | | 415/174.4 |
| 2013/0142641 A1* | 6/2013 | Landi | F01D 9/00 |
| | | | 415/208.2 |
| 2014/0205444 A1* | 7/2014 | Zheng | F01D 11/04 |
| | | | 415/173.1 |
| 2015/0086343 A1* | 3/2015 | Rizzo | F16J 15/44 |
| | | | 415/173.5 |
| 2016/0047265 A1 | 2/2016 | Matsumoto et al. | |
| 2019/0048734 A1 | 2/2019 | Kuwamura et al. | |

FOREIGN PATENT DOCUMENTS

| | | |
|---|---|---|
| JP | 2017-145813 | 8/2017 |
| WO | 2014/162767 | 10/2014 |

OTHER PUBLICATIONS

International Preliminary Report on Patentability and Written Opinion of the International Searching Authority dated Aug. 13, 2020 in International Application PCT/JP2019/002908, with English translation.

Notice of Reasons for Refusal dated Jun. 30, 2020 in corresponding Japanese Patent Application No. 2018-014884, with Machine translation.

* cited by examiner

AXIAL FLOW ROTATING MACHINERY

TECHNICAL FIELD

The present invention relates to an axial flow rotating machinery.

BACKGROUND ART

Typically known is an axial flow rotating machinery such as a steam turbine and a gas turbine used for a power generation plant or the like. This axial flow rotating machinery includes a nozzle structure body supported on a casing, a rotating blade structure body disposed downstream of the nozzle structure body and supported by a turbine rotor that is rotatable relative to the casing (hereinafter, merely referred to as a rotor), and a stator vane structure body disposed downstream of the rotating blade structure body and supported on the casing. The axial flow rotating machinery is configured to convert energy of a working fluid flowing from the upstream side toward the downstream side of the axial direction of the rotor into rotational energy of the rotor.

In the above axial flow rotating machinery, at a seal portion that seals the gap between the rotor or the rotating blade structure body and the casing, the working fluid deviated from the main flow passage flows therein while having a swirl component given when passing the nozzle, and thereby a spiral flow (so-called swirl flow) occurs in the circumferential direction of the rotor. In a case where the rotor becomes eccentric due to the swirl flow, a pressure distribution that has a sine wave shape and has a peak in a direction different from the eccentric direction of the rotor is generated in the circumferential distribution of the rotor. For instance, the pressure distribution may cause self-excited oscillation when the swirl flow increases in accordance with operation with a high output. Thus, various structures have been developed to suppress or prevent the swirl flow at the seal portion. For instance, Patent Document 1 discloses a configuration where a swirl brake is attached to the inlet side of a labyrinth seal and the swirl brake has such an angle that inverts the direction of the swirl flow in the circumferential direction.

CITATION LIST

Patent Literature

Patent Document 1: U.S. Pat. No. 4,420,161B

SUMMARY

Problems to be Solved

The movement of a swirl flow is complex at the cavity portion (seal inlet portion) at the radially outer side of the main flow. The present inventors conducted intensive researches and found that a swirl flow does not just flow in the circumferential direction of the rotor, but is a helix flow that traces a helix three-dimensionally while flowing in the circumferential direction. That is, a swirl flow flows in the circumferential direction (rotational direction) of the rotor while accompanying a three-dimensional helix movement in the radial direction and the axial direction of the rotor. Thus, when a swirl brake having such an angle that inverts the direction of the swirl flow in the circumferential direction is merely disposed at the inlet side of the labyrinth seal, it may not necessarily be effective in suppression of the swirl flow. Thus, there has been need for further improvement.

An object of at least some embodiments of the present invention is to prevent or suppress the swirl flow in an axial flow rotating machinery.

Solution to the Problems (1) According to at least one embodiment of the present disclosure, an axial flow rotating machinery includes: a rotor configured to rotate about an axis; a casing accommodating the rotor so as to be rotatable; a rotating-blade stage including rotating blades fixed to the rotor at intervals in a circumferential direction and a radially-outer side rotating blade ring continuing to radially outer ends of the rotating blades; and a rotating-blade side seal device configured to seal a gap between the radially-outer side rotating blade ring and the casing. The rotating-blade side seal device includes: a seal fin having an annular shape and extending toward an outer peripheral surface of the radially-outer side rotating blade ring from the casing; and a swirl brake fixed to the casing in a cavity formed at an upstream side of the seal fin. The swirl brake includes: a first plate-shaped member having a surface along a radial direction of the rotor, the first plate-shaped member extending along the axis or extending in a direction which interests with the axis such that a leading edge of the first plate-shaped member is positioned upstream of a trailing edge of the first plate-shaped member in a rotational direction of the rotor; and a second plate-shaped member or a third plate-shaped member having a surface oblique to the radial direction of the rotor, the second plate-shaped member extending from an inner end of the first plate-shaped member toward a downstream side in the rotational direction of the rotor and the third plate-shaped member extending from the inner end of the first plate-shaped member toward an upstream side in the rotational direction of the rotor.

During operation of the axial flow rotating machinery, a so-called swirl flow occurs, where a working fluid deviated from the main flow passage flows in the circumferential direction accompanying rotation of the rotor, and a pressure distribution of a sine-wave shape having a peak in a direction different from the eccentric direction of the rotor about the axis may be formed. Due to the seal exciting force based on the pressure distribution, self-excited oscillation of the rotor may occur due to the fluid force acting on the rotor in the direction perpendicular to the eccentric direction (direction that enhances oscillation), at the seal portion between the rotating blade stage and the casing. A swirl brake is used to suppress such oscillation, but the swirl flow inside the cavity is complex, and the swirl brake needs to be arranged appropriately to be fully effective.

In this regard, with the above configuration (1), the first plate-shaped member of the swirl brake fixed to the casing at the upstream side of the seal fin has a surface along the radial direction of the rotor, and extends along the axis, or in a direction that intersects with the axis such that the leading edge of the first plate-shaped member is positioned at the upstream side of the trailing edge of the first plate-shaped member in the rotational direction of the rotor. Furthermore, the swirl brake includes the second plate-shaped member extending toward the downstream side in the rotational direction of the rotor from the inner end of the first plate-shaped member via the first plate-shaped member. Or, the swirl brake includes the third plate-shaped member extending toward the upstream side in the rotational direction of the rotor from the inner end of the first plate-shaped member.

That is, it is possible to arrange the swirl brake so as to be perpendicular to the swirl flow that flows in spiral with respect to the circumferential direction of the rotor at a position that is different in the direction of the axis and the circumferential direction, and thus it is possible to suppress the swirl flow effectively and prevent unstable oscillation.

(2) In some embodiments, in the above configuration (1), an intersection angle between an extension direction of the first plate-shaped member and the axis is not smaller than 30 angular degrees and not greater than 60 angular degrees.

As a result of intensive researches by the present inventors, it was found that, with the first plate-shaped member arranged to form an inclination angle of 30 to 60 angular degrees with respect to the axis of the rotor, it is possible to suppress the velocity of the swirl flow at the seal fin considerably. That is, as seen in the radial direction of the rotor, when the intersection angular degree of the acute angle formed between the axis of the rotor and the line connecting the leading edge and the trailing edge of the first plate-shaped member is not smaller than 30 angular degrees and not greater than 60 angular degrees, it is possible to suppress the swirl flow effectively. Thus, with the above configuration (2), the first plate-shaped member is arranged at an inclination angle of 30 to 60 angular degrees with respect to the axis, and thereby it is possible to obtain the axial flow rotating machinery capable of suppressing the swirl flow appropriately.

(3) In some embodiments, in the above configuration (1), the first plate-shaped member extends along the axis.

With the above configuration (3), the swirl brake fixed to the casing at the upstream side of the seal fin includes the first plate-shaped member having a surface along the radial direction of the rotor and being arranged along the axial direction. Also with the above configuration, it is possible to arrange the swirl brake so as to be perpendicular to the swirl flow that flows in spiral with respect to the circumferential direction of the rotor at a position that is different in the axial direction and the circumferential direction, and thus it is possible to suppress the swirl flow effectively and prevent unstable oscillation.

(4) In some embodiments, in any one of the above configurations (1) to (3), the swirl brake includes the first plate-shaped member, the second plate-shaped member, and the third plate-shaped member disposed at an upstream side of the second plate-shaped member.

With the above configuration (4), it is possible to arrange the swirl brake so as to be perpendicular to the swirl flow that flows in spiral with respect to the circumferential direction of the rotor at a plurality of positions that are different in the axial direction and the circumferential direction of the rotor, and thus it is possible to suppress the swirl flow more effectively and prevent unstable oscillation.

(5) In some embodiments, in the above configuration (4), the swirl brake includes a single plate member. The second plate-shaped member and the third plate-shaped member are configured to be capable of bending with respect to the first plate-shaped member independently from one another. On the inner end of the first plate-shaped member, a first bending portion which causes the second plate-shaped member to extend toward the downstream side in the rotational direction of the rotor and a second bending portion which causes the third plate-shaped member toward the upstream side in the rotational direction of the rotor are formed.

With the above configuration (5), it is possible to form the swirl brake including the first plate-shaped member, the second plate-shaped member, and the third plate-shaped member with the single plate member integrally. The second plate-shaped member extends toward the downstream side in the rotational direction of the rotor via the first bending portion, without affecting the third plate-shaped member. The third plate-shaped member extends toward the upstream side in the rotational direction of the rotor via the second bending portion, without affecting the second plate-shaped member. Thus, it is possible to implement the axial flow rotating machinery that has the effect described in the above configuration (4) through a simple configuration. Such a swirl brake can be formed by, for instance, preparing a single plate member, bending the second plate-shaped member toward the downstream side, which is one of the two sides of the rotational direction of the rotor, via the first bending portion, and bending the third plate-shaped member to the upstream side, which is the other one of the two sides of the rotational direction of the rotor. Accordingly, it is possible to obtain the axial flow rotating machinery that has an improved workability and that can be easily assembled.

(6) In some embodiments, in the above configuration (4) or (5), the second plate-shaped member is formed so as to extend such that a distance from the inner end of the first plate-shaped member toward the downstream side in the rotational direction of the rotor becomes longer toward a downstream side in an axial direction, and the third plate-shaped member is formed so as to extend such that a distance from the inner end of the first plate-shaped member toward the upstream side in the rotational direction of the rotor becomes longer toward an upstream side in the axial direction.

The swirl flow collides with the second plate-shaped member positioned downstream of the third plate-shaped member both in the axial direction and in the rotational direction of the rotor, at the upstream side and from the inner side toward the outer side in the radial direction. Thus, most of the swirl flow colliding with the second plate-shaped member is likely to flow to the downstream side in the axial direction and to the downstream side in the rotational direction. Furthermore, the swirl flow collides with the third plate-shaped member at the downstream side in the axial direction of the rotor and, at the upstream side of the rotational direction and from the outer side toward the inner side in the radial direction. Thus, most of the swirl flow colliding with the third plate-shaped member is likely to flow to the upstream side in the axial direction and generate a flow component that flows toward the upstream side of the rotational direction due to the existence of the first plate-shaped member or the like.

In this regard, with the above configuration (6), the second plate-shaped member extends further downstream in the rotational direction of the rotor toward the downstream side in the axial direction of the rotor, and the third plate-shaped member extends further upstream in the rotational direction of the rotor toward the upstream side of the axis. Accordingly, it is possible to form the swirl brake to be appropriately perpendicular to the swirl flow that flows in spiral about the circumferential direction of the rotor appropriately even in a small area, and prevent the swirl flow.

(7) In some embodiments, in any one of the above configurations (1) to (6), the axial flow rotating machinery further includes a downstream-side guide member having an annular shape and extending toward an inner side in the radial direction of the rotor from the casing at an upstream side of the seal fin. An upstream side surface of the downstream-side guide member is formed to have a curved shape such that a length of the downstream-side guide member along the radial direction of the rotor becomes smaller toward an upstream side in an axial direction and is recessed toward the cavity.

With the above configuration (7), with the upstream side surface of the downstream-side guide member, it is possible to guide the working fluid deviated from the main flow passage toward the upstream side of the axis toward the outer side in the radial direction. That is, it is possible to guide the swirl flow to flow in spiral about the circumferential direction of the rotor, and thus it is possible to assist the swirl brake of the present disclosure to be positioned perpendicular to at least a part of the swirl flow, and suppress the swirl flow effectively.

(8) In some embodiments, in the above configuration (7), the axial flow rotating machinery further includes an upstream-side guide member having an annular shape and extending toward the inner side in the radial direction of the rotor from the casing at an upstream side of the downstream-side guide member. A downstream side surface of the upstream-side guide member is formed to have a curved shape such that a length of the upstream-side guide member along the radial direction of the rotor becomes smaller toward a downstream side in the axial direction and is recessed toward the cavity.

With the above configuration (8), with the downstream side surface of the upstream-side guide member, it is possible to guide the working fluid that is guided to the upstream side surface of the seal fin and the inner periphery of the casing after deviating from the main flow passage and introduced to the upstream side of the axis, to the inner side of the radial direction toward the upstream side of the axis. That is, it is possible to guide the swirl flow to flow in spiral about the circumferential direction of the rotor, and thus it is possible to assist the swirl brake of the present disclosure to be positioned perpendicular to at least a part of the swirl flow, and suppress the swirl flow effectively.

(9) In some embodiments, in any one of the above configurations (1) to (8), the axial flow rotating machinery further includes a stator-side guide member having an annular shape and extending toward an inner side in the radial direction of the rotor from the casing at an upstream side of the seal fin. An upstream side surface of the stator-side guide member is formed to have: a root side surface extending along the radial direction of the rotor; and a tip side surface connected to an inner side of the root side surface with respect to the radial direction, the tip side surface having a curved shape such that a length of the stator-side guide member along the radial direction of the rotor becomes smaller toward an upstream side in an axial direction and is recessed toward the cavity.

With the above configuration (9), with the tip side surface having a curved shape disposed on the stator-side guide member, it is possible to cause the working fluid arriving at the outer side of the radial direction from the outer periphery of the radially-outer side rotating blade ring after deviating from the main flow passage to flow toward the outer periphery of the radially-outer side rotating blade ring at the upstream side of the seal fin, and thereby it is possible to generate a swirl efficiently. Accordingly, for the flow of the working fluid flowing toward the downstream side of the axis through the gap between the seal fin and the radially-outer side rotating blade ring, it is possible to reduce leakage, and maintain or improve the seal function.

(10) In some embodiments, in the above configuration (9), the axial flow rotating machinery further includes a rotor-side guide member having an annular shape and extending toward an outer side in the radial direction of the rotor from the outer peripheral surface of the radially-outer side rotating blade ring at an upstream side of the stator-side guide member. A downstream side surface of the rotor-side guide member is formed to have a curved shape such that a length of the rotor-side guide member along the radial direction of the rotor becomes smaller toward a downstream side in the axial direction and is recessed toward the tip side surface of the stator-side guide member.

With the above configuration (10), with the rotor-side guide member, it is possible to cause the working fluid arriving at the outer side of the radial direction along the upstream side surface of the radially-outer side rotating blade ring after deviating from the main flow passage to flow in spiral toward the outer periphery of the radially-outer side rotating blade ring at the upstream side of the seal fin, and thereby it is possible to generate a swirl efficiently. Accordingly, for the flow of the working fluid flowing toward the downstream side of the axis through the gap between the seal fin and the radially-outer side rotating blade ring, it is possible to reduce leakage, and maintain or improve the seal function.

(11) According to at least one embodiment of the present disclosure, an axial flow rotating machinery includes: a rotor configured to rotate about an axis; a casing accommodating the rotor so as to be rotatable; a stator-vane stage including stator vanes fixed to the casing at intervals in a circumferential direction and a radially-inner side stator vane ring continuing to radially inner ends of the stator vanes; and a stator-vane side seal device configured to seal a gap between the radially-inner side stator vane ring and the rotor. The stator-vane side seal device includes: a seal fin having an annular shape and extending from an inner peripheral surface of the radially-inner side stator vane ring toward the rotor; and a swirl brake fixed to the radially-inner side stator vane ring at an upstream side of the seal fin. The swirl brake includes: a first plate-shaped member having a surface along a radial direction of the rotor, the first plate-shaped member extending along the axis or extending in a direction which interests with the axis such that a leading edge of the first plate-shaped member is positioned upstream of a trailing edge of the first plate-shaped member in a rotational direction of the rotor; and a second plate-shaped member or a third plate-shaped member having a surface oblique to the radial direction of the rotor, the second plate-shaped member extending from an inner end of the first plate-shaped member toward a downstream side in the rotational direction of the rotor and the third plate-shaped member extending from the inner end of the first plate-shaped member toward an upstream side in the rotational direction of the rotor.

During operation of the axial flow rotating machinery, a so-called swirl flow occurs, where a working fluid deviated from the main flow passage flows in the circumferential direction accompanying rotation of the rotor, and a pressure distribution of a sine-wave shape having a peak in a direction different from the eccentric direction of the rotor about the axis may be formed. Due to the seal exciting force based on the pressure distribution, self-excited oscillation of the rotor may occur due to the fluid force acting on the rotor in the direction perpendicular to the eccentric direction (direction that enhances oscillation), at the seal portion between the rotating blade stage and the casing. A swirl brake is used to suppress such oscillation, but the swirl brake inside the cavity is complex, and the swirl brake is not fully effective unless appropriately disposed.

With the above configuration (11), the stator vane stage can also have the effect of the rotating blade stage to suppress the swirl flow described in the above (1). That is, the first plate-shaped member of the swirl brake fixed to the radially-inner side stator vane ring at the upstream of the seal fin has a surface along the radial direction of the rotor, and extends along the axis, or in a direction that intersects with the axis such that the leading edge of the first plate-shaped member is positioned at the upstream side of the trailing edge of the first plate-shaped member in the rotational direction of the rotor. Furthermore, the swirl brake includes a second plate-shaped member extending toward the downstream side in the rotational direction of the rotor from the inner end of the first plate-shaped member via the first plate-shaped member. Or, the swirl brake includes the third plate-shaped member extending toward the upstream side in the rotational direction of the rotor from the inner end of the first plate-shaped member. That is, it is possible to arrange the swirl brake so as to be perpendicular to the swirl flow that flows in spiral with respect to the circumferential direction of the rotor at a position different in the axial direction and the circumferential direction, and thus it is possible to suppress the swirl flow effectively and prevent unstable oscillation.

Advantageous Effects

According to some embodiments of the present invention, it is possible to prevent or suppress the swirl flow in the axial flow rotating machinery.

DETAILED DESCRIPTION

Embodiments of the present invention will now be described with reference to the accompanying drawings. It is intended, however, that unless particularly specified, dimensions, materials, shapes, relative positions and the like of components described in the embodiments shall be interpreted as illustrative only and not intended to limit the scope of the present invention unless particularly specified.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
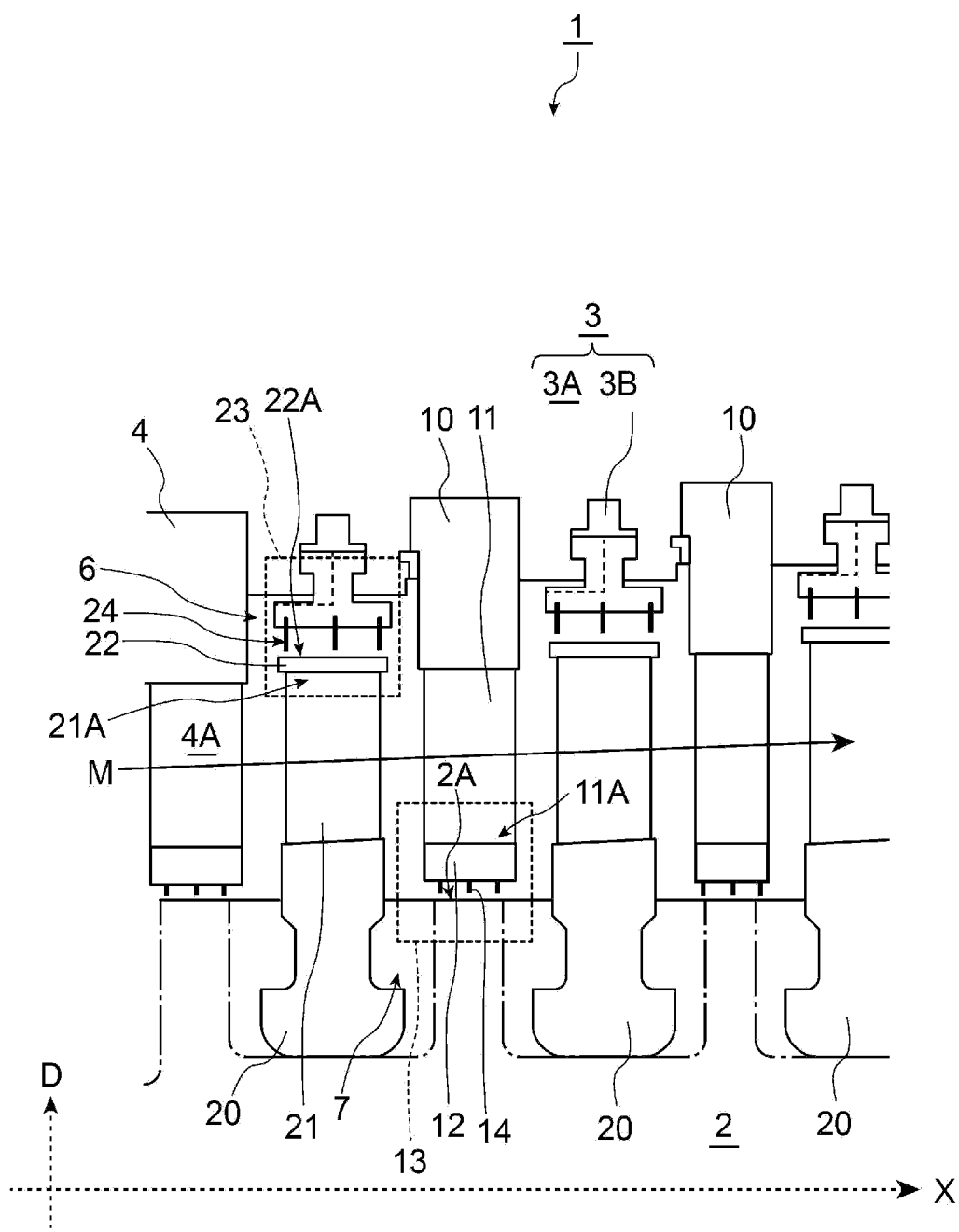
FIG. 1 is a schematic diagram of a configuration example of an axial flow rotating machinery according to an embodiment.
Figure 2:
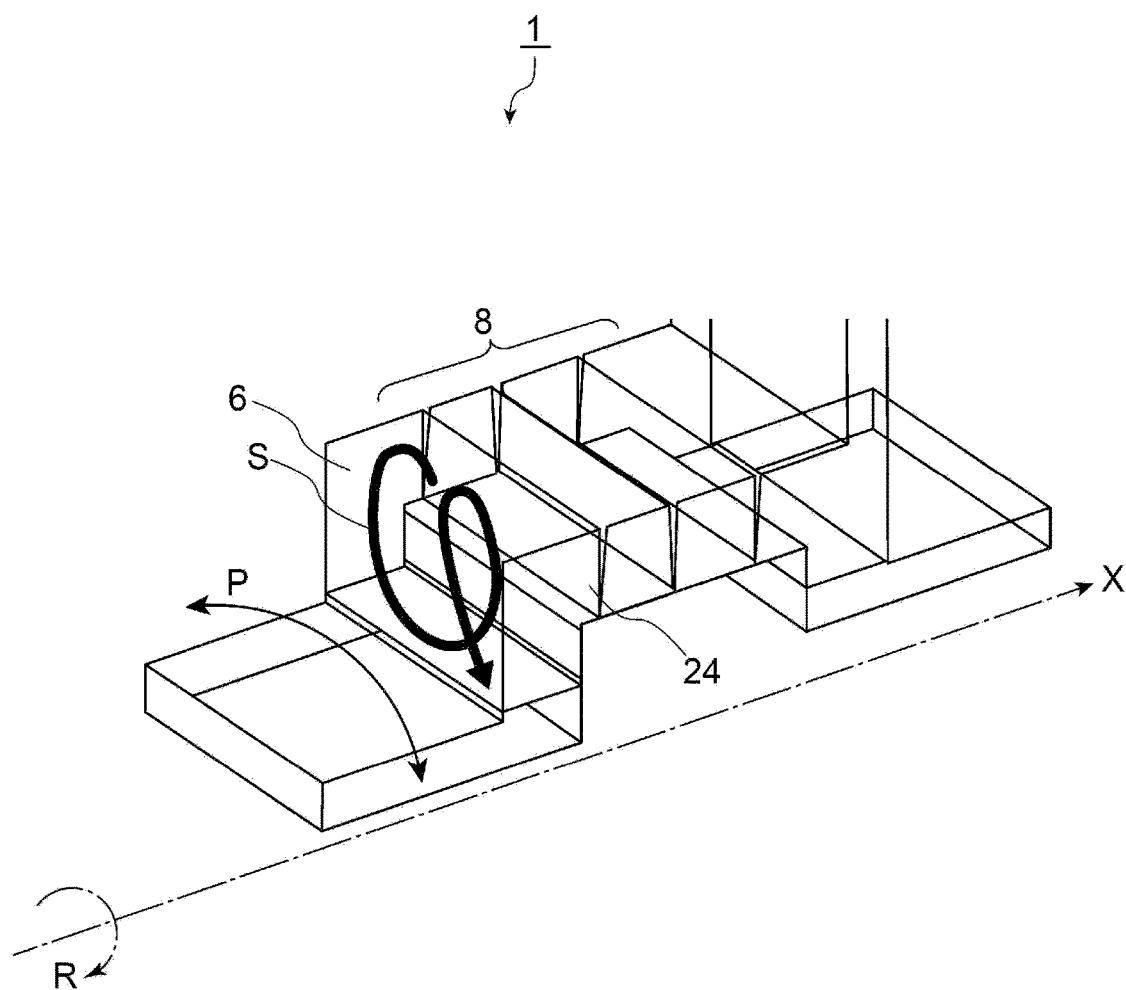
FIG. 2 is a schematic view of a swirl flow that occurs inside the cavity of an axial flow rotating machinery according to an embodiment.
Figure 3:
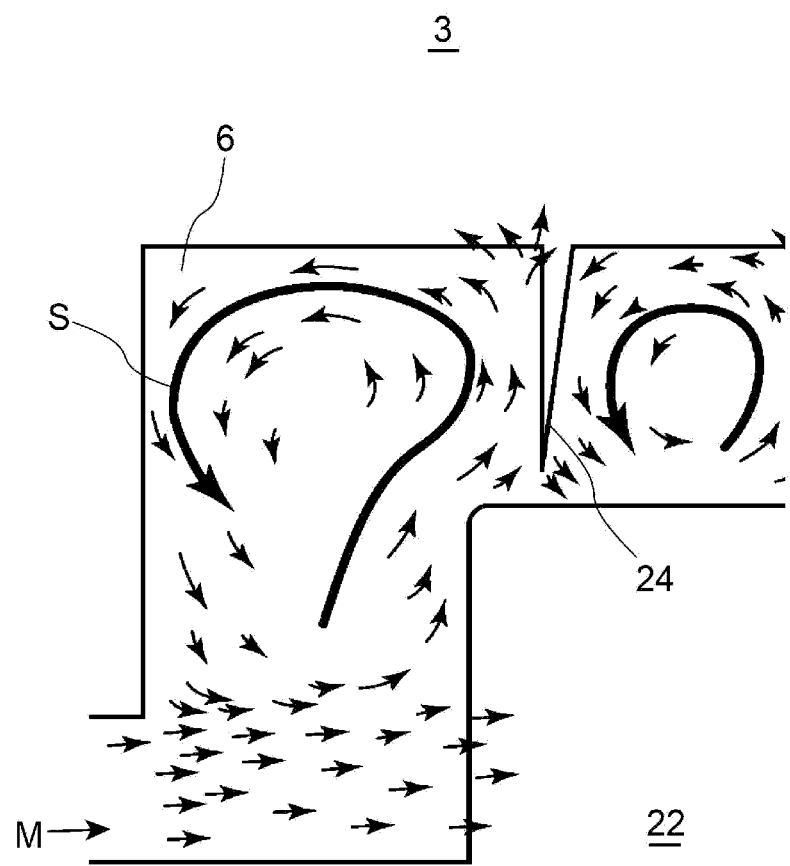
FIG. 3 is a side cross-sectional view showing a flow of a working fluid that flows through a seal portion between a rotating blade and a casing.

FIG. 1 is a schematic diagram of a configuration example of an axial flow rotating machinery according to an embodiment. FIG. 2 is a schematic view of a swirl flow that occurs inside the cavity of an axial flow rotating machinery according to an embodiment. FIG. 3 is a side cross-sectional view showing a flow of a working fluid that flows through a seal portion between a rotating blade and a casing.

<Embodiment Related to the Rotating-Blade Side Seal Device 23>

As depicted in FIGS. 1 to 3, an axial flow rotating machinery 1 according to at least one embodiment of the present disclosure includes a rotor 2 that rotates about the axis X, a casing 3 that accommodates the rotor 2 so as to be rotatable, a stator vane stage 10 including a plurality of stator vanes 11 fixed to the casing 3 at intervals in the circumferential direction P and a radially-inner side stator vane ring 12 continuing to radially inner ends 11A of the plurality of stator vanes 11, and a rotating blade stage 20 including a plurality of rotating blades 21 fixed to the rotor 2 at intervals in the circumferential direction P and a radially-outer side rotating blade ring 22 continuing to radially outer ends 21A of the plurality of rotating blades 21, and a rotating-blade side seal device 23 that seals a gap between the radially-outer side rotating blade ring 22 and the casing 3. Furthermore, the stator vanes 11 include a nozzle structure body 4 which includes at least one nozzle 4A, the nozzle structure body 4 being a stator vane disposed most upstream of the plurality of stator vanes 11.

The axial flow rotating machinery 1 according to some embodiments is applicable as an axial flow turbine such as a steam turbine and a gas turbine used in a power system of a power generation plant and a ship.

The rotor 2 may be coupled to a non-depicted generator or a power transmission system such as a ship. The rotor 2 transmits driving power to convert the rotational force of the rotor 2 into electric energy with a generator, or to utilize the rotational force as a propelling force of a ship, for instance. In some embodiments, a plurality of rotating blades 21 may be fixed to the rotor 2. The rotating blades 21 may be arranged in a radial fashion at intervals in the circumferential direction of the rotor 2, on the outer peripheral surface of the rotor 2.

A supply pipe for gas or steam (not depicted) may be coupled to the casing 3, such that combustion gas generated in a combustor (not depicted) or steam generated in a boiler (not depicted) is supplied to the axial flow rotating machinery 1 as a working fluid from the upstream side of the above described stator vane 11 (nozzle structure body 4) disposed most upstream. The working fluid supplied to the axial flow rotating machinery 1 is guided to the most upstream turbine stage of the plurality of turbine stages.

The above described stator vane stage 10 and the rotating blade stage 20 are arranged alternately in the axial direction of the rotor 2. Furthermore, a single stator vane stage 10 and a single rotating blade stage 20 that is disposed downstream and next to the single stator vane stage 10 together form a single turbine stage. In the axial flow rotating machinery 1, a plurality of such turbine stages are disposed in the axial direction of the rotor 2. As described above, the working fluid supplied via the supply pipe for gas or steam passes through the plurality of turbine stages, and perform work on the rotating blade 21, whereby the rotor 2 is rotary driven. Subsequently, the working fluid after passing through the rotating blade 21 of the final stage is discharged outside the axial flow rotating machinery 1 through an exhaust flow passage.

In some embodiments, the casing 3 may include a support body 3B (see FIG. 1) that supports a seal fin 24 (described below) that forms the rotating-blade side seal device 23, in addition to a casing body 3A.

The rotating-blade side seal device 23 includes an annular seal fin 24 that extends toward the outer peripheral surface 22A of the radially-outer side rotating blade ring 22 from the casing 3, and a swirl brake 30 fixed to the casing 3 in a cavity 6 formed at the upstream side of the seal fin 24.

The seal fin 24 is arranged at the most upstream side of at least one labyrinth seal of the rotating-blade side seal device 23, in an annular shape about the axis X. Furthermore, in some embodiments of the present disclosure, a seal portion 8 refers to a portion for preventing leakage of the working fluid between the upstream side and the downstream side of each of the rotating blade stage 20 and the stator vane stage 10 with at least one labyrinth seal including the seal fin 24.

The swirl brake 30 is for preventing formation of a swirl flow S along the circumferential direction P of the rotor 2, and is supported on the casing 3 or the rotor 2 inside the cavity 6. In some embodiments, a plurality of swirl brakes 30 may be arranged in a radial fashion at intervals along the inner periphery of the casing 3.

Figure 6A:
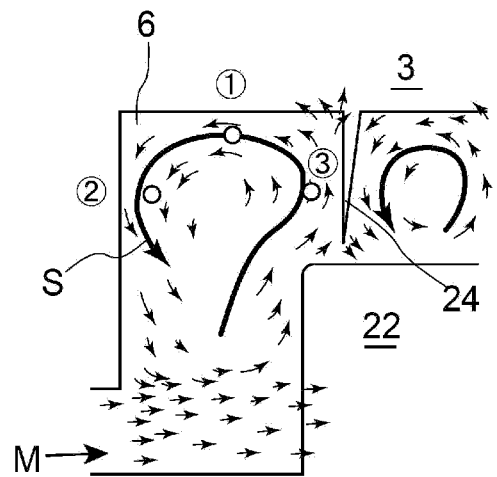
FIG. 6A is a side cross-sectional view of a flow of a working fluid inside a cavity according to an embodiment.
Figure 6B:
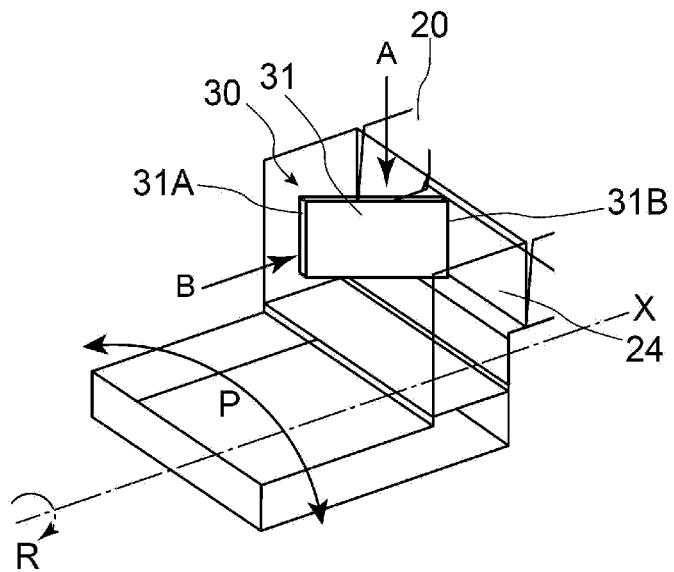
FIG. 6B is a perspective view showing an arrangement of a swirl brake according to an embodiment.
Figure 6C:
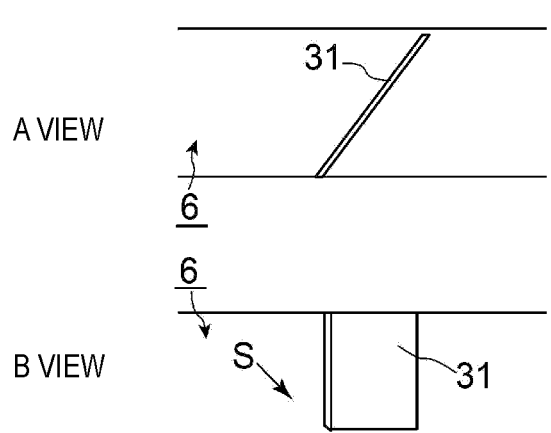
FIG. 6C is a diagram showing the A directional view and the B directional view of FIG. 6B.

Furthermore, the swirl brake 30 according to an embodiment of the present disclosure includes a first plate-shaped member 31 having a surface along the radial direction D of the rotor 2. The first plate-shaped member 31 extends in a direction which intersects with the axis X such that the leading edge 31A of the first plate-shaped member 31 is positioned upstream of the trailing edge 31B of the first plate-shaped member 31 with respect to the rotational direction R of the rotor 2 (see FIGS. 6B and 7B).

Next, the flow of the working fluid in the axial flow rotating machinery 1 will be described.

As depicted in FIGS. 1 to 4, when a working fluid such as combustion gas generated by a non-depicted combustor and steam generated by a non-depicted boiler is supplied to the axial flow rotating machinery 1, the working fluid is guided from the upstream side toward the downstream side through a main flow passage M formed by the gap between adjacent rotating blades 21 and the nozzle 4A. Further, the rotor 2 receives kinetic energy of the working fluid via the rotating blades 21, and rotates in the rotational direction R (see FIG. 2). Furthermore, the working fluid at the upstream side has a higher pressure than the working fluid at the downstream side. Thus, in the gap between the casing 3 and the radially-outer side rotating blade ring 22, the working fluid is guided to the downstream side through the gap between the at least one labyrinth seal including the seal fin 24 and the radially-outer side rotating blade ring 22, and is returned to the main flow passage M.

Figure 4:
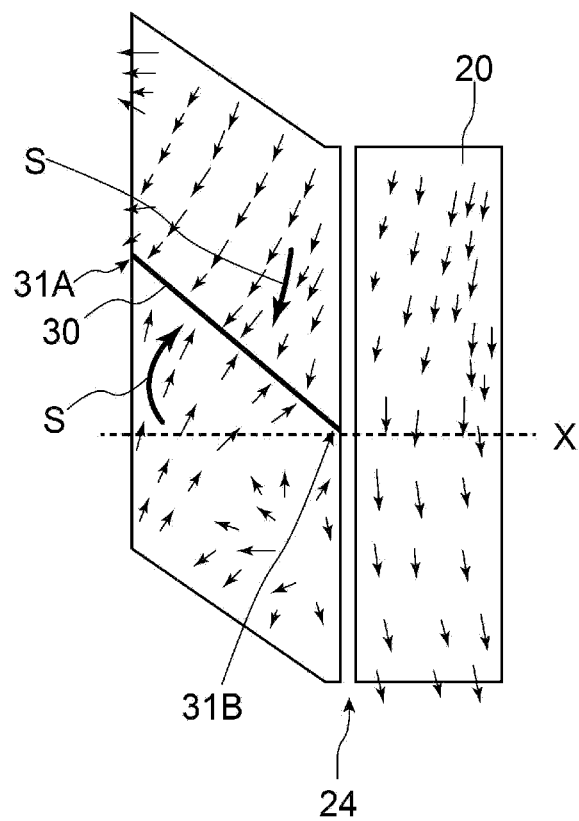
FIG. 4 is a schematic diagram showing an arrangement of a swirl brake according to an embodiment.

During operation of the axial flow rotating machinery 1, the working fluid flows therein while having a swirl flow component that is given when passing through the nozzle, and thereby a flow of the working fluid in the rotational direction R, that is, a swirl flow, is formed (see FIGS. 2 to 4). Similarly, in the cavity 7 (see FIG. 1) in the gap between the rotating blade stage 20 and the radially-inner side stator vane ring 12, a swirl flow S occurs in the working fluid deviated from the main flow passage M, and a sine-wave shaped pressure distribution having a peak in a direction different from the eccentric direction of the rotor about the axis is formed. Due to the seal exciting force based on the pressure distribution, self-excited oscillation of the rotor 2 occurs due to the fluid force in the direction perpendicular to the eccentric direction, at the seal portion 8 between the rotating blade stage 20 and the casing 3. A swirl brake 30 is used to suppress such oscillation, but the swirl flow S inside the cavity 6 is complex, and the swirl brake 30 needs to be appropriately arranged to be fully effective.

The present inventors conducted intensive researches and found that a swirl flow S does not just flow in the circumferential direction of the rotor, but is a helix flow that traces a helix three-dimensionally while flowing in the circumferential direction (see FIGS. 2 to 4 and 6A). That is, the swirl flow S flows in the circumferential direction (rotational direction) of the rotor while accompanying a three-dimensional helix movement in the radial direction and the axial direction of the rotor.

Figure 5:
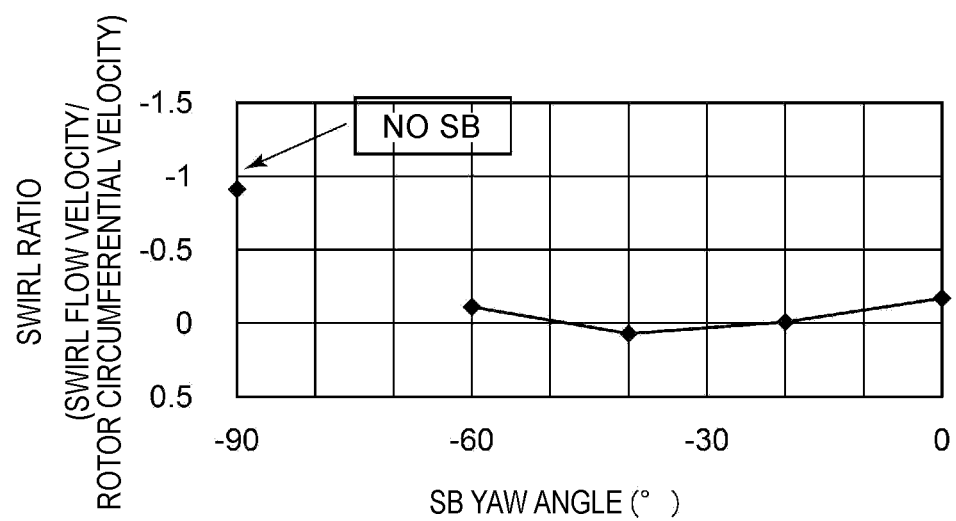
FIG. 5 is a diagram showing a relationship between an attachment angle of a first plate-shaped member of a swirl brake with respect to the axis and a swirl velocity at a seal fin.

FIG. 5 is a diagram showing a relationship between an attachment angle of the first plate-shaped member 31 of the swirl brake 30 with respect to the axis X and a swirl velocity at the seal fin 24. The yaw angle of the swirl brake (SB) 30 is an acute angle formed between the axis X and a line connecting the leading edge 31A and the trailing edge 31B, when the leading edge 31A of the first plate-shaped member 31 is positioned at the upstream side of the trailing edge 31B with respect to the rotational direction R of the rotor 2. As depicted in FIG. 5, it was found that, with the first plate-shaped member 31 arranged with an appropriate yaw angle with respect to the axis X such that the leading edge 31A is positioned at the upstream side of the trailing edge 31B with respect to the rotational direction R, it is possible to suppress the swirl velocity at the seal fin 24.

That is, with the above configuration, the first plate-shaped member 31 of the swirl brake 30 fixed to the casing 3 at the upstream side of the seal fin 24 has a surface along the radial direction D of the rotor 2, and is arranged such that the leading edge 31A is positioned at the upstream side of the trailing edge 31B with respect to the rotational direction R of the rotor 2. Thus, the first plate-shaped member 31 can be arranged to be perpendicular to at least a part of the swirl flow S that flows in the circumferential direction P of the rotor 2 at the upstream side of the seal fin 24 and flows in spiral in a helix fashion about the circumferential direction P of the rotor 2, and thereby it is possible to suppress the swirl flow S effectively.

In some embodiments, the swirl brake 30 may be arranged such that the intersection angle between the axis X and the extension direction of the first plate-shaped member 31 is not smaller than 30 angular degrees and not greater than 60 angular degrees. The intersection angle between the first plate-shaped member 31 and the axis X may be, for instance, 45 angular degrees.

As a result of intensive research conducted by the present inventors, it was found that, with the first plate-shaped member 31 arranged to form an inclination angle of 30 to 60 angular degrees with respect to the axis X of the rotor 2, it is possible to suppress the velocity of the swirl flow S at the seal fin 24 considerably (see FIG. 5). That is, as seen in the radial direction D of the rotor 2, when the intersection angular degree of the acute angle formed between the axis X of the rotor 2 and the line connecting the leading edge 31A and the trailing edge 31B of the first plate-shaped member 31 is not smaller than 30 angular degrees and not greater than 60 angular degrees, it is possible to suppress the swirl flow S effectively. Thus, with the above configuration, the first plate-shaped member 31 is arranged at an inclination angle of 30 to 60 angular degrees with respect to the axis X, and thus it is possible to obtain the axial flow rotating machinery 1 capable of suppressing the swirl flow S appropriately.

Figure 7A:
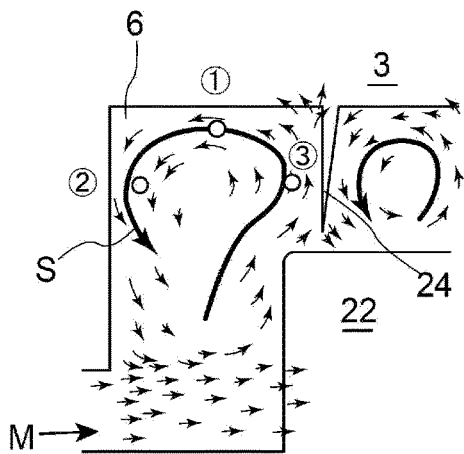
FIG. 7A is a side cross-sectional view of a flow of a working fluid inside a cavity according to an embodiment.
Figure 7B:
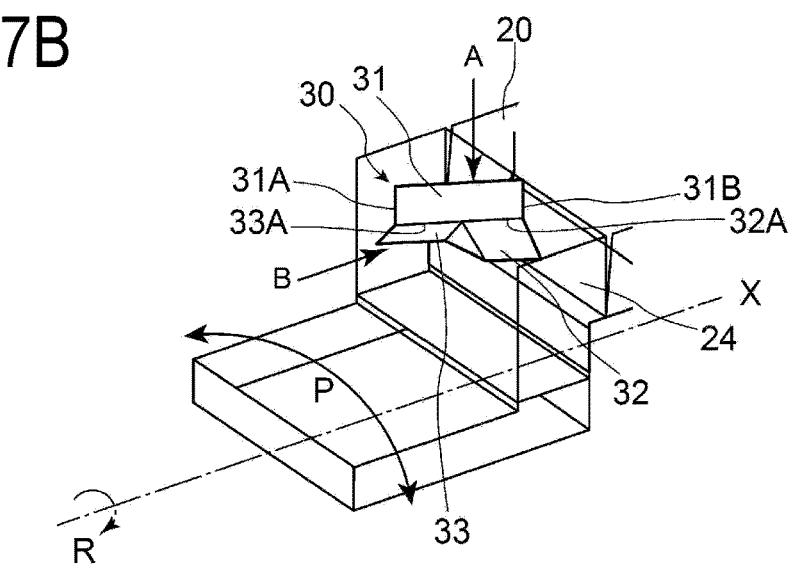
FIG. 7B is a perspective view showing an arrangement of a swirl brake according to an embodiment.
Figure 7C:
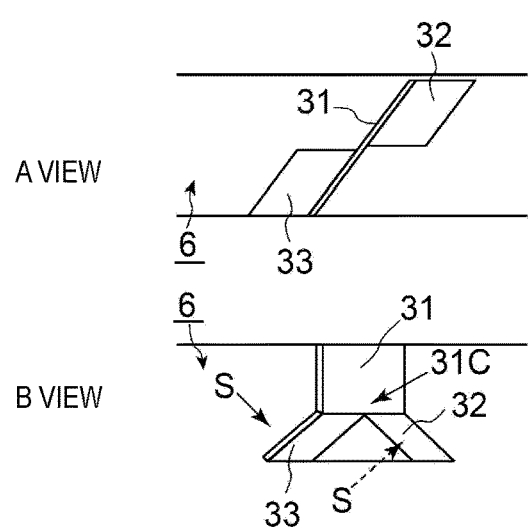
FIG. 7C is a diagram showing the A directional view and the B directional view of FIG. 7B.
Figure 8A:
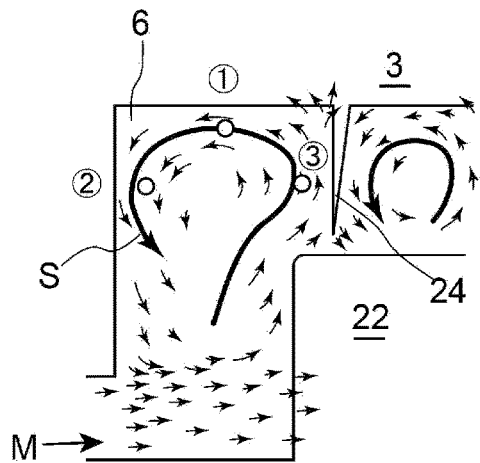
FIG. 8A is a side cross-sectional view of a flow of a working fluid inside a cavity according to an embodiment.
Figure 8B:
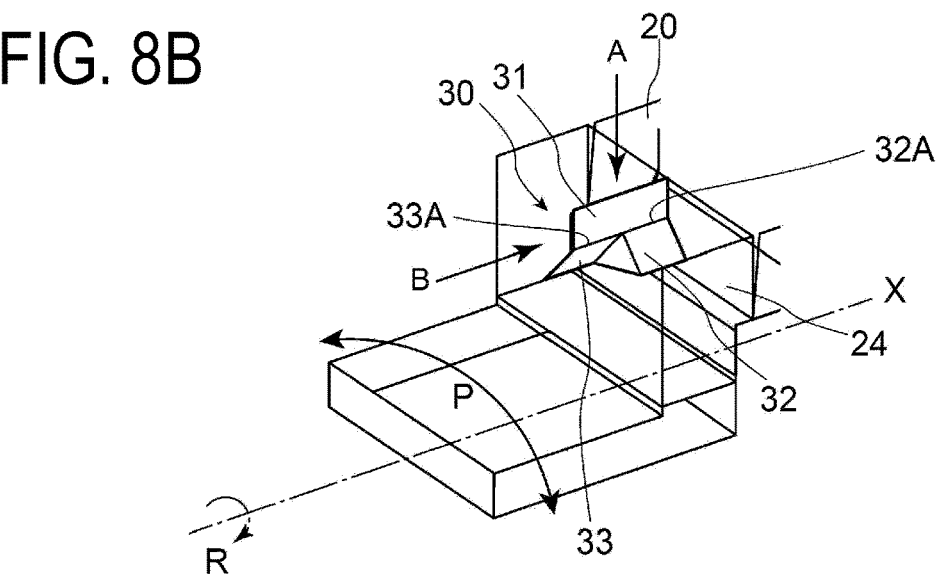
FIG. 8B is a perspective view showing an arrangement of a swirl brake according to an embodiment.
Figure 8C:
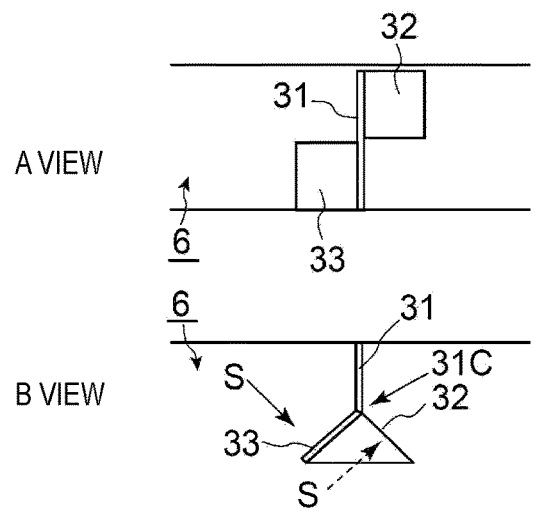
FIG. 8C is a diagram showing the A directional view and the B directional view of FIG. 8B.
Figure 9A:
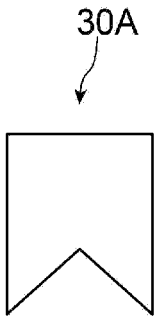
FIG. 9A is a side cross-sectional view of a working fluid inside a cavity according to an embodiment.
Figure 9B:
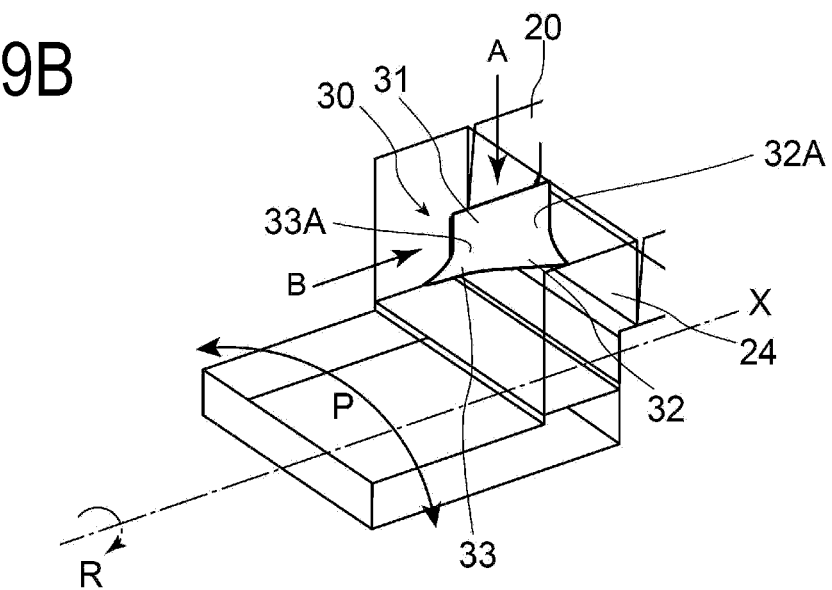
FIG. 9B is a perspective view showing an arrangement of a swirl brake according to an embodiment.
Figure 9C:
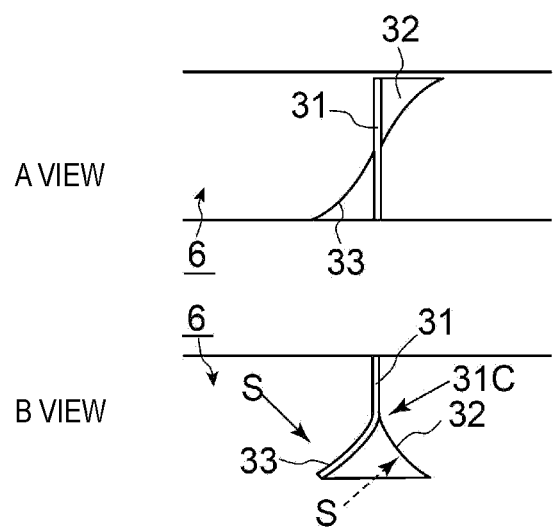
FIG. 9C is a diagram showing the A directional view and the B directional view of FIG. 9B.

FIG. 7A is a side cross-sectional view of a working fluid inside a cavity according to an embodiment. FIG. 7B is a perspective view showing an arrangement of a swirl brake according to an embodiment. FIG. 7C is a diagram showing the A directional view and the B directional view of FIG. 7B. FIG. 8A is a side cross-sectional view of a working fluid inside a cavity according to an embodiment. FIG. 8B is a perspective view showing an arrangement of a swirl brake according to an embodiment. FIG. 8C is a diagram showing the A directional view and the B directional view of FIG. 8B. FIG. 9A is a side cross-sectional view of a working fluid inside a cavity according to an embodiment. FIG. 9B is a perspective view showing an arrangement of a swirl brake according to an embodiment. FIG. 9C is a diagram showing the A directional view and the B directional view of FIG. 9B.

In some embodiments, the swirl brake 30 may further include a second plate-shaped member 32 and a third plate-shaped member 33 having a surface oblique with respect to the radial direction D of the rotor 2. The second plate-shaped member 32 extends from the inner end of the first plate-shaped member 31 toward the downstream side in the rotational direction R of the rotor 2. The third plate-shaped member 33 extends from the inner end of the first plate-shaped member 31 toward the upstream side in the rotational direction R of the rotor 2, at the upstream side of the second plate-shaped member 32.

With the above configuration, with the second plate-shaped member 32 extending from the inner end 31C of the first plate-shaped member 31 toward the downstream side in the rotational direction R of the rotor 2 via the first plate-shaped member 31 and the third plate-shaped member 33 extending from the inner end 31C toward the upstream side in the rotational direction R of the rotor 2, it is possible to arrange the swirl brake 30 so as to be perpendicular to the swirl flow S that flows in spiral with respect to the circumferential direction P of the rotor 2, at different positions in the circumferential direction P. Thus, it is possible to suppress the swirl flow S more effectively, and prevent occurrence of unstable oscillation.

As depicted in FIGS. 8A to 8C and 9A to 9C, in some embodiments, the swirl brake 30 may include a first plate-shaped member 31 having a surface along the radial direction D of the rotor 2 and extending along the axis X, and a second plate-shaped member 32 or a third plate-shaped member 33 having a surface oblique with respect to the radial direction D of the rotor 2. The second plate-shaped member 32 extends from the inner end 31C of the first plate-shaped member 31 toward the downstream side in the rotational direction R of the rotor 2. The third plate-shaped member 33 extends from the inner end 31C of the first plate-shaped member 31 toward the upstream side in the rotational direction R of the rotor 2, at the upstream side of the second plate-shaped member 32.

With the above configuration, the swirl brake 30 fixed to the casing 3 at the upstream side of the seal fin 24 includes the first plate-shaped member 31 having a surface along the radial direction D of the rotor 2 and being arranged along the direction of the axis X, and the second plate-shaped member 32 extending toward the downstream side of the rotational direction R of the rotor 2 from the inner end 31C of the first plate-shaped member 31 via the first plate-shaped member 31. Alternatively, the swirl brake 30 includes the third plate-shaped member 33 extending toward the upstream side in the rotational direction of the rotor 2 from the inner end 31C of the first plate-shaped member 31. That is, it is possible to arrange the swirl brake 30 so as to be perpendicular to the swirl flow S that flows in spiral with respect to the circumferential direction P of the rotor 2 at a position that is different in the direction of the axis X and the circumferential direction P, and thus it is possible to suppress the swirl flow S effectively and prevent unstable oscillation.

In some embodiments, the swirl brake 30 may include the first plate-shaped member 31, the second plate-shaped member 32, and the third plate-shaped member 33. Accordingly, it is possible to arrange the swirl brake 30 so as to be perpendicular to the swirl flow S that flows in spiral with respect to the circumferential direction P of the rotor 2 at a plurality of different positions in the direction of the axis X of the rotor 2 and the circumferential direction P, and thus it is possible to suppress the swirl flow S more effectively and prevent unstable oscillation.

As illustrated unlimitedly in FIGS. 9A to 9C, in some embodiments, the swirl brake 30 may include a single plate member 30A. Further, the second plate-shaped member 32 and the third plate-shaped member 33 may be configured to be capable of bending with respect to the first plate-shaped member 31 independently from one another. Moreover, on the inner end 31C of the first plate-shaped member 31, a first bending portion 32A which causes the second plate-shaped member 32 to extend toward the downstream side in the rotational direction R of the rotor 2 and a second bending portion 33A which causes the third plate-shaped member 33 toward the upstream side in the rotational direction R of the rotor 2 may be formed.

With the above configuration, it is possible to form the swirl brake 30 including the first plate-shaped member 31, the second plate-shaped member 32, and the third plate-shaped member 33 with the single plate member 30A integrally. The second plate-shaped member 32 extends toward the downstream side in the rotational direction R of the rotor 2 via the first bending portion 32A, without affecting the third plate-shaped member 33. The third plate-shaped member 33 extends toward the upstream side in the rotational direction R of the rotor 2 via the second bending portion 33A, without affecting the second plate-shaped member 32. Thus, it is possible to implement the axial flow rotating machinery 1 that has the effect described with reference to at least one of the above embodiments with a simple configuration.

The above described swirl brake 30 can be formed by, for instance, preparing a single plate member 30A, forming a cut-out or a gap between the second plate-shaped member 32 and the third plate-shaped member 33, bending the second plate-shaped member 32 toward the downstream side, which is one of the two sides of the rotational direction R of the rotor 2, via the first bending portion 32A, and bending the third plate-shaped member 33 to the upstream side, which is the other one of the two sides of the rotational direction R of the rotor 2. Accordingly, it is possible to obtain the axial flow rotating machinery 1 that has an improved workability and that can be easily assembled.

As illustrated unlimitedly in FIGS. 9A to 9C, in some embodiments, the second plate-shaped member 32 may be formed so as to extend such that a distance from the inner end 31C of the first plate-shaped member 31 toward the downstream side in the rotational direction R of the rotor 2 becomes longer toward the downstream side of the axis X, and the third plate-shaped member 33 may be formed so as to extend such that a distance from the inner end 31C of the first plate-shaped member 31 toward the upstream side in the rotational direction R of the rotor 2 becomes longer toward the upstream side of the axis X.

The swirl flow S collides with the second plate-shaped member 32 positioned downstream of the third plate-shaped member 33 both in the direction of the axis X of the rotor 2 and in the rotational direction R, at the upstream side and from the inner side toward the outer side in the radial direction D. Thus, most of the swirl flow S colliding with the second plate-shaped member 32 is likely to flow to the downstream side in the direction of the axis X and to the downstream side in the rotational direction R. On the other hand, the swirl flow S collides with the third plate-shaped member 33 at the downstream side in the direction of the axis X of the rotor 2, the upstream side of the rotational direction R and from the outer side toward the inner side in the radial direction D. Thus, most of the swirl flow S colliding with the third plate-shaped member 33 is likely to flow to the upstream side in the direction of the axis X and generate a flow component that flows toward the upstream side of the rotational direction R due to the existence of the first plate-shaped member 31, for instance.

In this regard, with the above configuration, the second plate-shaped member 32 extends further downstream in the rotational direction R of the rotor 2 toward the downstream side in the direction of the axis X of the rotor 2, and the third plate-shaped member 33 extends further upstream in the rotational direction R of the rotor 2 toward the upstream side of the axis. Accordingly, it is possible to form the swirl brake 30 to be perpendicular to the swirl flow S that flows in spiral about the circumferential direction P of the rotor 2 appropriately even with a small area, and prevent the swirl flow S.

Figure 10A:
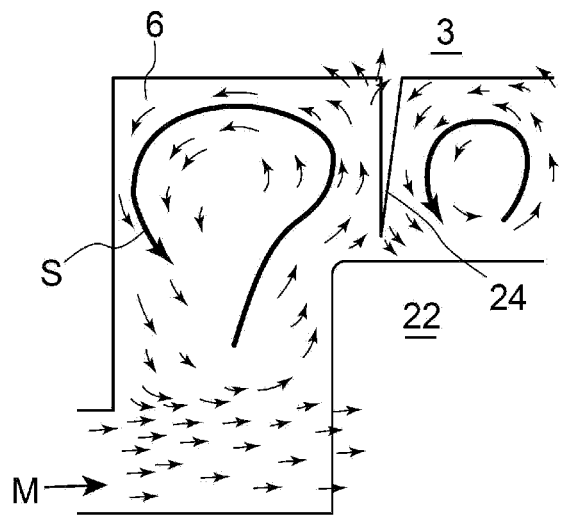
FIG. 10A is a side cross-sectional view of a working fluid inside a cavity according to an embodiment.
Figure 10B:
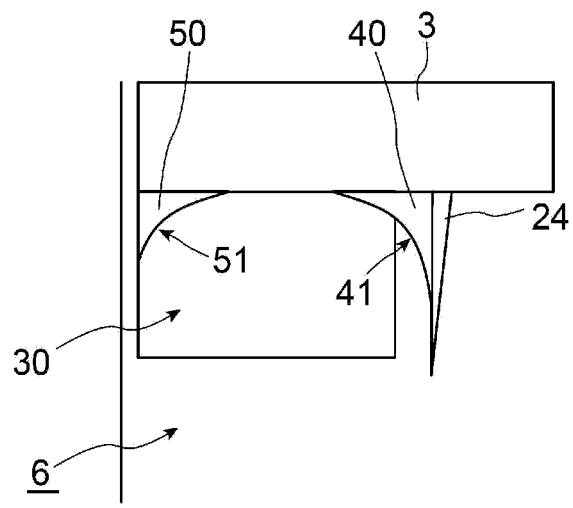
FIG. 10B is a perspective view showing an arrangement of a swirl brake according to an embodiment.

FIG. 10A is a side cross-sectional view of a working fluid inside a cavity according to an embodiment. FIG. 10B is a perspective view showing the arrangement of a swirl brake according to an embodiment.

In some embodiments, at the upstream side of the seal fin 24, the swirl brake 30 may further include a downstream-side guide member 40 having an annular shape and extending toward the inner side in the radial direction D of the rotor 2 from the casing 3 (see FIG. 10B).

The upstream side surface 41 of the downstream-side guide member 40 may be formed to have a curved shape such that the length of the downstream-side guide member 40 along the radial direction D of the rotor 2 becomes smaller toward the upstream side in the direction of the axis X and is recessed toward the cavity 6.

With the above configuration, with the upstream side surface 41 of the downstream-side guide member 40, it is possible to guide the working fluid deviated from the main flow passage M toward the upstream side of the axis X with distance toward the outer side in the radial direction D. That is, it is possible to guide the swirl flow S to flow in spiral about the circumferential direction P of the rotor 2, and thus it is possible to assist the swirl brake 30 of the present disclosure to be perpendicular to at least a part of the swirl flow S, and suppress the swirl flow S effectively.

In some embodiments, at the upstream side of the downstream-side guide member 40, the swirl brake 30 may further include an upstream-side guide member 50 having an annular shape and extending toward the inner side in the radial direction D of the rotor 2 from the casing 3 (see FIG. 10B).

The downstream side surface 51 of the upstream-side guide member 50 may be formed to have a curved shape such that a length of the upstream-side guide member 50 along the radial direction D of the rotor 2 becomes smaller toward the downstream side in the direction of the axis X and is recessed toward the cavity 6.

With the above configuration, with the downstream side surface 51 of the upstream-side guide member 50, it is possible to guide the working fluid that is guided to the upstream side surface of the seal fin 24 and the inner periphery of the casing 3 from the main flow passage M and introduced to the upstream side of the axis X, to the inner side of the radial direction D with distance toward the upstream side of the axis X. That is, it is possible to guide the swirl flow S to flow in spiral about the circumferential direction P of the rotor 2, and thus it is possible to assist the swirl brake 30 of the present disclosure to be perpendicular to at least a part of the swirl flow S, and suppress the swirl flow S effectively.

Figure 11A:
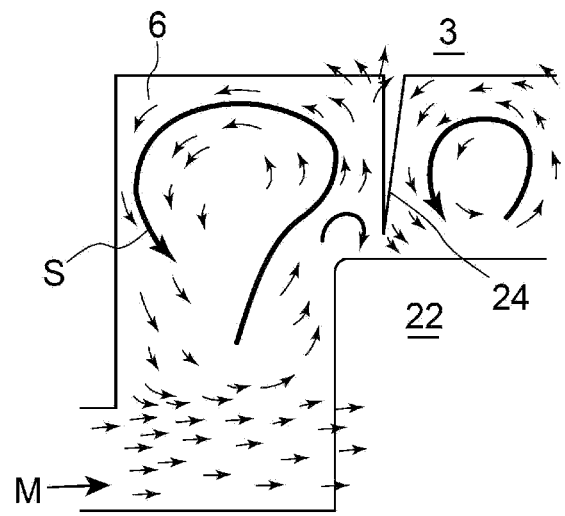
FIG. 11A is a side cross-sectional view of a working fluid inside a cavity according to an embodiment.
Figure 11B:
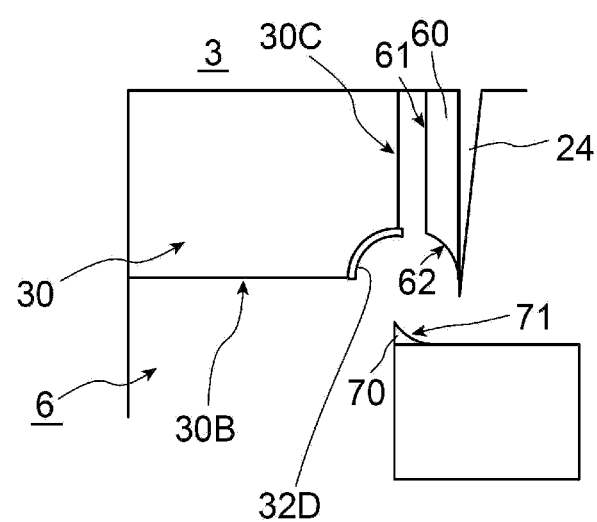
FIG. 11B is a side view showing the arrangement of a swirl brake according to an embodiment.

FIG. 11A is a side cross-sectional view of a working fluid inside a cavity according to an embodiment. FIG. 11B is a perspective view showing the arrangement of a swirl brake according to an embodiment.

In some embodiments, at the upstream side of the seal fin 24, the swirl brake 30 may further include a stator-side guide member 60 having an annular shape and extending toward the inner side in the radial direction D of the rotor 2 from the casing 3 (see FIG. 11B).

The upstream side surface 41 of the stator-side guide member 60 may be formed to have a root side surface 61 extending along the radial direction D of the rotor 2, and a tip side surface 62 connected to the inner side of the root side surface 61 with respect to the radial direction D. The tip side surface 62 has a curved shape such that a length of the stator-side guide member 60 along the radial direction D of the rotor 2 becomes smaller toward the upstream side in the direction of the axis X and is recessed toward the cavity 6.

With the above configuration, with the tip side surface 62 having a curved shape disposed on the stator-side guide member 60, it is possible to cause the working fluid arriving at the outer side of the outer periphery of the radially-outer side rotating blade ring 22 in the radial direction D after deviating from the main flow passage M to flow toward the outer periphery of the radially-outer side rotating blade ring 22 at the upstream side of the seal fin 24, and thereby it is possible to generate a small swirl just before the seal clearance efficiently. Accordingly, by applying a contraction effect to the flow of the working fluid flowing toward the downstream side of the axis X through the gap between the seal fin 24 and the radially-outer side rotating blade ring 22, it is possible to reduce leakage, and maintain or improve the seal function.

In some embodiments, at the upstream side of the stator-side guide member 60, the swirl brake 30 may further include a rotor-side guide member 70 having an annular shape and extending toward the outer side in the radial direction D of the rotor 2 from the outer peripheral surface 22A of the radially-outer side rotating blade ring 22 (see FIG. 11B).

The downstream side surface 71 of the rotor-side guide member 70 may be formed to have a curved shape such that a length of the rotor-side guide member along the radial direction D of the rotor 2 becomes smaller toward the downstream side in the direction of the axis X and is recessed toward the tip side surface 62 of the stator-side guide member 60.

With the above configuration, with the rotor-side guide member 70, it is possible to cause the working fluid arriving at the outer side of radial direction D along the upstream side surface 41 of the radially-outer side rotating blade ring 22 after deviating from the main flow passage M to flow in spiral toward the outer periphery of the radially-outer side rotating blade ring 22 at the upstream side of the seal fin 24, and thereby it is possible to generate a swirl efficiently. Accordingly, for the working fluid flowing toward the downstream side of the axis X through the gap between the seal fin 24 and the radially-outer side rotating blade ring 22, it is possible to reduce leakage, and maintain or improve the seal function.

Furthermore, in some embodiments, the swirl brake 30 may include a cut-out portion 30D having a curved surface recessed toward the radially-outer side rotating blade ring 22 from the radially inner end 30B of the swirl brake 30 to the downstream-side end 30C of the swirl brake 30, in a cross-sectional view including the axis X (see FIG. 11B). A plurality of cut-out portions 30D may be arranged at intervals along the circumferential direction P with the swirl brake 30, or in an annular shape along the circumferential direction P. Accordingly, it is possible to cause the working fluid to flow in spiral toward the outer periphery of the radially-outer side rotating blade ring 22 at the upstream side of the seal fin 24 and generate a swirl efficiently, whereby it is possible to maintain or improve the seal function as described above.

<Embodiment Related to the Stator-Vane Side Seal Device 13>

An axial flow rotating machinery 1 according to at least one embodiment of the present disclosure may include a rotor 2 that rotates about the axis X, a casing 3 that accommodates the rotor 2 so as to be rotatable, a stator vane stage 10 including a plurality of stator vanes 11 fixed to the casing 3 at intervals in the circumferential direction P and a radially-inner side stator vane ring 12 continuing to radially inner ends 11A of the plurality of stator vanes 11, and a rotating blade stage 20 including a plurality of rotating blades 21 fixed to the rotor 2 at intervals in the circumferential direction P and a radially-outer side rotating blade ring 22 continuing to radially outer ends 21A of the plurality of rotating blades 21, and a stator-vane side seal device 13 that seals a gap between the radially-inner side stator vane ring 12 and the rotor 2.

As depicted in FIGS. 1 to 3, the axial flow rotating machinery 1 according to at least one embodiment of the present disclosure includes a rotor 2 that rotates about the axis X, a casing 3 that accommodates the rotor 2 so as to be rotatable, a stator vane stage 10 including a plurality of stator vanes 11 fixed to the casing 3 at intervals in the circumferential direction P and a radially-inner side stator vane ring 12 continuing to radially inner ends 11A of the plurality of stator vanes 11, and a rotating blade stage 20 including a plurality of rotating blades 21 fixed to the rotor 2 at intervals in the circumferential direction P and a radially-outer side rotating blade ring 22 continuing to radially outer ends 21A of the plurality of rotating blades 21, and a stator-vane side seal device 13 that seals a gap between the radially-inner side stator vane ring 12 and the rotor 2. Furthermore, the stator vanes 11 include a nozzle structure body 4 which includes at least one nozzle 4A, the nozzle structure body 4 being a stator vane disposed most upstream of the plurality of stator vanes 11.

The axial flow rotating machinery 1 according to some embodiments is applicable as an axial flow turbine such as a steam turbine and a gas turbine used in a power system of a power generation plant and a ship.

The rotor 2 may be coupled to a non-depicted generator or a power transmission system such as a ship. The rotor 2 transmits driving power to convert the rotational force of the rotor 2 into electric energy with a generator, or to utilize the rotational force as a propelling force of a ship or the like. In some embodiments, a plurality of rotating blades 21 may be fixed to the rotor 2. The rotating blades 21 may be arranged in a radial fashion at intervals in the circumferential direction of the rotor 2, on the outer peripheral surface of the rotor 2.

A supply pipe for gas or steam (not depicted) may be coupled to the casing 3, such that combustion gas generated in a combustor (not depicted) or steam generated in a boiler (not depicted) is supplied to the axial flow rotating machinery 1 as a working fluid from the upstream side of the above described stator vane 11 (nozzle structure body 4) disposed most upstream. The working fluid supplied to the axial flow rotating machinery 1 is guided to the most upstream turbine stage of the plurality of turbine stages.

Furthermore, the above described stator vane stage 10 and the rotating blade stage 20 are arranged alternately in the axial direction of the rotor 2. Furthermore, a single stator vane stage 10 and a single rotating blade stage 20 disposed downstream and next to the single stator vane stage 10 together form a single turbine stage. In the axial flow rotating machinery 1, a plurality of such turbine stages are disposed in the axial direction of the rotor 2. As described above, the working fluid supplied via the supply pipe for gas or steam passes through the plurality of turbine stages, and perform work on the rotating blade 21, whereby the rotor 2 is rotary driven. Subsequently, the working fluid after passing through the rotating blade 21 of the final stage is discharged outside the axial flow rotating machinery 1 through an exhaust flow passage.

In some embodiments, the casing 3 may include a support body 3B (see FIG. 1) that supports a seal fin 14 (described below) that forms the rotating-blade side seal device 23.

The stator-vane side seal device 13 may include an annular seal fin 14 that extends toward the inner peripheral surface of the radially-inner side stator vane ring 12 toward the rotor 2, and a swirl brake 30 fixed to the radially-inner side stator vane ring 12 at the upstream side of the seal fin 14.

The seal fin 14 is arranged at the most upstream side of at least one labyrinth seal of the stator-vane side seal device 13, in an annular shape about the axis X.

The swirl brake 30 is for preventing formation of the swirl flow S along the circumferential direction P of the rotor 2, and is supported on the upstream side surface of the radially-inner side stator vane ring 12, for instance. In some embodiments, a plurality of swirl brakes 30 may be arranged in a radial fashion at intervals along the upstream side surface of the radially-inner side stator vane ring 12.

Furthermore, the swirl brake 30 according to an embodiment of the present disclosure includes a first plate-shaped member 31 having a surface along the radial direction D of the rotor 2. The first plate-shaped member 31 extends in a direction which intersects with the axis X such that the leading edge 31A of the first plate-shaped member 31 is positioned upstream of the trailing edge 31B with respect to the rotational direction R of the rotor 2.

With the above configuration, the stator vane stage 10 can also have the effect of the rotating blade stage 20 to suppress the swirl flow described in the above embodiments. That is, the first plate-shaped member 31 of the swirl brake 30 fixed to the radially-inner side stator vane ring 12 at the upstream side of the seal fin 14 has a surface along the radial direction D of the rotor 2, and is arranged such that the leading edge 31A is positioned at the upstream side of the trailing edge 31B in the rotational direction R of the rotor 2. That is, the first plate-shaped member 31 can be arranged so as to be perpendicular to at least a part of the swirl flow S that flows in the circumferential direction P of the rotor 2 at the upstream side of the seal fin 14 and that flows in spiral about the circumferential direction P of the rotor 2, and thus it is possible to suppress the swirl flow S effectively.

Next, the flow of the working fluid in the axial flow rotating machinery 1 will be described.

As depicted in FIGS. 1 to 4, when a working fluid such as combustion gas generated by a non-depicted combustor and steam generated by a non-depicted boiler is supplied to the axial flow rotating machinery 1, the working fluid is guided from the upstream side toward the downstream side through a main flow passage M formed by the gap between adjacent rotating blades 21 and the nozzle 4A. Further, the rotor 2 receives kinetic energy of the working fluid via the rotating blades 21, and rotates in the rotational direction R (see FIG. 2). Furthermore, the working fluid at the upstream side has a higher pressure than the working fluid at the downstream side. Thus, in the gap between the rotor 2 and the radially-inner side stator vane ring 12, the working fluid is guided to the downstream side through the gap between the at least one labyrinth seal including the seal fin 14 and the outer peripheral surface of the rotor 2, and is returned to the main flow passage M.

During operation of the axial flow rotating machinery 1, the working fluid flows therein while having a swirl flow component that is given when passing through the nozzle, and thereby a flow of the working fluid flowing in the rotational direction R, that is, a swirl flow, is formed (see FIGS. 2 to 4). Similarly in the cavity 7 (see FIG. 1) in the gap between the rotating blade stage 20 and the radially-inner side stator vane ring 12, a swirl flow S occurs in the working fluid deviated from the main flow passage M, and a sine-wave shaped pressure distribution having a peak in a direction different from the eccentric direction of the rotor about the axis is formed. Due to the seal exciting force based on the pressure distribution, self-excited oscillation of the rotor 2 occurs due to the fluid force in the direction perpendicular to the eccentric direction, at the stator-vane side seal device 13. A swirl brake 30 is used to suppress such oscillation, but the swirl flow S inside the cavity 7 is complex, and the swirl brake 30 needs to be arranged appropriately to be fully effective.

The present inventors conducted intensive researches and found that a swirl flow S does not just flow in the circumferential direction of the rotor, but is a helix flow that traces a helix three-dimensionally while flowing in the circumferential direction (see FIGS. 2 to 4 and 6A). That is, the swirl flow S flows in the circumferential direction (rotational direction) of the rotor while accompanying a three-dimensional helix movement in the radial direction and the axial direction of the rotor.

FIG. 5 is a diagram showing a relationship between an attachment angle of the first plate-shaped member 31 of the swirl brake 30 with respect to the axis and a swirl velocity at the seal fin 14. The yaw angle of the swirl brake (SB) 30 is an acute angle formed between the axis X and a line connecting the leading edge 31A and the trailing edge 31B, when the leading edge 31A of the first plate-shaped member 31 is positioned at the upstream side of the trailing edge 31B with respect to the rotational direction R of the rotor 2. As depicted in FIG. 5, it was found that, with the first plate-shaped member 31 arranged with an appropriate yaw angle with respect to the axis X such that the leading edge 31A is positioned at the upstream side of the trailing edge 31B with respect to the rotational direction R, it is possible to suppress the swirl velocity at the seal fin 14.

That is, with the above configuration, the first plate-shaped member 31 of the swirl brake 30 fixed to the casing 3 at the upstream side of the seal fin 14 has a surface along the radial direction D of the rotor 2, and is arranged such that the leading edge 31A is positioned at the upstream side of the trailing edge 31B with respect to the rotational direction R of the rotor 2. Thus, the first plate-shaped member 31 can be arranged to be perpendicular to at least a part of the swirl flow S that flows in the circumferential direction P of the rotor 2 at the upstream side of the seal fin 14 and flows in spiral about the circumferential direction P of the rotor 2, and thereby it is possible to suppress the swirl flow S effectively.

In some embodiments, the swirl brake 30 may be arranged such that the intersection angle between the axis X and the extension direction of the first plate-shaped member 31 is not smaller than 30 angular degrees and not greater than 60 angular degrees. The intersection angle between the first plate-shaped member 31 and the axis X may be, for instance, 45 angular degrees.

As a result of intensive research conducted by the present inventors, it was found that, with the first plate-shaped member 31 arranged to form an inclination angle of 30 to 60 angular degrees with respect to the axis X of the rotor 2, it is possible to suppress the velocity of the swirl flow S at the seal fin 14 considerably (see FIG. 5). That is, as seen in the radial direction D of the rotor 2, when the intersection angular degree of the acute angle formed between the axis X of the rotor 2 and the line connecting the leading edge 31A and the trailing edge 31B of the first plate-shaped member 31 is not smaller than 30 angular degrees and not greater than 60 angular degrees, it is possible to suppress the swirl flow S effectively. Thus, with the above configuration, the first plate-shaped member 31 is arranged at an inclination angle of 30 to 60 angular degrees with respect to the axis X, it is possible to obtain the axial flow rotating machinery 1 capable of suppressing the swirl flow S appropriately.

FIG. 7A is a side cross-sectional view of a flow of a working fluid inside a cavity according to an embodiment. FIG. 7B is a perspective view showing an arrangement of a swirl brake according to an embodiment. FIG. 7C is a diagram showing the A directional view and the B directional view of FIG. 7B. FIG. 8A is a side cross-sectional view of a flow of a working fluid inside a cavity according to an embodiment. FIG. 8B is a perspective view showing an arrangement of a swirl brake according to an embodiment. FIG. 8C is a diagram showing the A directional view and the B directional view of FIG. 8B. FIG. 9A is a side cross-sectional view of a flow of a working fluid inside a cavity according to an embodiment. FIG. 9B is a perspective view showing an arrangement of a swirl brake according to an embodiment. FIG. 9C is a diagram showing the A directional view and the B directional view of FIG. 9B.

The above drawings correspond to the rotating-blade side seal device 23. Thus, the cavity 6 in the drawings should be read as the cavity 7, and the other corresponding features should be read as those corresponding to the stator-vane side seal device 13.

In some embodiments, the swirl brake 30 may further include a second plate-shaped member 32 and a third plate-shaped member 33 having a surface oblique with respect to the radial direction D of the rotor 2. The second plate-shaped member 32 extends from the inner end of the first plate-shaped member 31 toward the downstream side in the rotational direction R of the rotor 2. The third plate-shaped member 33 extends from the inner end of the first plate-shaped member 31 toward the upstream side in the rotational direction R of the rotor 2, at the upstream side of the second plate-shaped member 32.

With the above configuration, with the second plate-shaped member 32 extending from the inner end 31C of the first plate-shaped member 31 toward the downstream side in the rotational direction R of the rotor 2 via the first plate-shaped member 31 and the third plate-shaped member 33 extending from the inner end 31C toward the upstream side in the rotational direction R of the rotor 2, it is possible to arrange the swirl brake 30 so as to be perpendicular to the swirl flow S that flows in spiral with respect to the circumferential direction P of the rotor 2, at different positions in the circumferential direction P. Thus, it is possible to suppress the swirl flow S more effectively, and prevent occurrence of unstable oscillation.

As depicted in FIGS. 8A to 8C and 9A to 9C, in some embodiments, the swirl brake 30 may include a first plate-shaped member 31 having a surface along the radial direction D of the rotor 2 and extending along the axis X, and a second plate-shaped member 32 or a third plate-shaped member 33 having a surface oblique with respect to the radial direction D of the rotor 2. The second plate-shaped member 32 extends from the inner end 31C of the first plate-shaped member 31 toward the downstream side in the rotational direction R of the rotor 2. The third plate-shaped member 33 extends from the inner end 31C of the first plate-shaped member 31 toward the upstream side in the rotational direction R of the rotor 2, at the upstream side of the second plate-shaped member 32.

With the above configuration, the swirl brake 30 fixed to the casing 3 at the upstream side of the seal fin 14 includes the first plate-shaped member 31 having a surface along the radial direction D of the rotor 2 and being arranged along the direction of the axis X, and the second plate-shaped member 32 extending toward the downstream side of the rotational direction R of the rotor 2 from the inner end 31C of the first plate-shaped member 31 via the first plate-shaped member 31. Or, the swirl brake 30 includes the third plate-shaped member 33 extending toward the upstream side in the rotational direction of the rotor 2 from the inner end 31C of the first plate-shaped member 31. That is, it is possible to arrange the swirl brake 30 so as to be perpendicular to the swirl flow S that flows in spiral with respect to the circumferential direction P of the rotor 2 at a position that is different in the direction of the axis X and the circumferential direction P, and thus it is possible to suppress the swirl flow S effectively and prevent unstable oscillation.

In some embodiments, the swirl brake 30 may include the first plate-shaped member 31, the second plate-shaped member 32, and the third plate-shaped member 33. Accordingly, it is possible to arrange the swirl brake 30 so as to be perpendicular to the swirl flow S that flows in spiral with respect to the circumferential direction P of the rotor 2 at a plurality of different positions in the direction of the axis X of the rotor 2 and the circumferential direction P, and thus it is possible to suppress the swirl flow S more effectively and prevent unstable oscillation.

As illustrated unlimitedly in FIGS. 9A to 9C, in some embodiments, the swirl brake 30 may include a single plate member 30A, the second plate-shaped member 32 and the third plate-shaped member 33 may be configured to be capable of bending with respect to the first plate-shaped member 31 independently from one another, and, on the inner end 31C of the first plate-shaped member 31, a first bending portion 32A which causes the second plate-shaped member 32 to extend toward the downstream side in the rotational direction R of the rotor 2 and a second bending portion 33A which causes the third plate-shaped member 33 toward the upstream side in the rotational direction R of the rotor 2 may be formed.

With the above configuration, it is possible to form the swirl brake 30 including the first plate-shaped member 31, the second plate-shaped member 32, and the third plate-shaped member 33 with the single plate member 30A integrally. The second plate-shaped member 32 extends toward the downstream side in the rotational direction R of the rotor 2 via the first bending portion 32A, without affecting the third plate-shaped member 33. The third plate-shaped member 33 extends toward the upstream side in the rotational direction R of the rotor 2 via the second bending portion 33A, without affecting the second plate-shaped member 32. Thus, it is possible to implement the axial flow rotating machinery 1 that has the effect described with reference to at least one of the above embodiments with a simple configuration.

The above described swirl brake 30 can be formed by, for instance, preparing a single plate member 30A, forming a cut-out or a gap between the second plate-shaped member 32 and the third plate-shaped member 33, bending the second plate-shaped member 32 toward the downstream side with respect to the rotational direction R of the rotor 2 via the first bending portion 32A, and bending the third plate-shaped member 33 to the upstream side with respect to the rotational direction R of the rotor 2. Accordingly, it is possible to obtain the axial flow rotating machinery 1 that has an improved workability and that can be easily assembled.

As illustrated unlimitedly in FIGS. 9A to 9C, in some embodiments, the second plate-shaped member 32 may be formed so as to extend such that a distance from the inner end 31C of the first plate-shaped member 31 toward the downstream side in the rotational direction R of the rotor 2 becomes longer toward the downstream side of the axis X, and the third plate-shaped member 33 may be formed so as to extend such that a distance from the inner end 31C of the first plate-shaped member 31 toward the upstream side in the rotational direction R of the rotor 2 becomes longer toward the upstream side of the axis X.

The swirl flow S collides with the second plate-shaped member 32 positioned downstream of the third plate-shaped member 33 both in the direction of the axis X of the rotor 2 and in the rotational direction R, at the upstream side and from the inner side toward the outer side in the radial direction D. Thus, most of the swirl flow S colliding with the second plate-shaped member 32 is likely to flow to the downstream side in the direction of the axis X and to the downstream side in the rotational direction R. On the other hand, the swirl flow S collides with the third plate-shaped member 33 at the downstream side in the direction of the axis X of the rotor 2, at the upstream side of the rotational direction R, and from the outer side toward the inner side in the radial direction D. Thus, most of the swirl flow S colliding with the third plate-shaped member 33 is likely to flow to the upstream side in the direction of the axis X and generates a flow component that flows toward the upstream side of the rotational direction R due to the existence of the first plate-shaped member 31 or the like.

In this regard, with the above configuration, the second plate-shaped member 32 extends further downstream in the rotational direction R of the rotor 2 with distance toward the downstream side in the direction of the axis X of the rotor 2, and the third plate-shaped member 33 extends further upstream in the rotational direction R of the rotor 2 with distance toward the upstream side of the axis. Accordingly, it is possible to form the swirl brake 30 to be perpendicular to the swirl flow S that flows in spiral about the circumferential direction P of the rotor 2 appropriately even with a small area, and prevent the swirl flow S.

FIG. 10A is a side cross-sectional view of a flow of a working fluid inside a cavity according to an embodiment. FIG. 10B is a perspective view showing an arrangement of a swirl brake according to an embodiment.

The above drawings correspond to the rotating-blade side seal device 23. Thus, the cavity 6 in the drawings should be read as the cavity 7, and the other corresponding features should be read as those corresponding to the stator-vane side seal device 13.

In some embodiments, at the upstream side of the seal fin 14, the swirl brake 30 may further include a downstream-side guide member 40 having an annular shape and extending toward the outer side in the radial direction D of the rotor 2 from the outer peripheral surface of the rotor 2 (see FIG. 10B).

The upstream side surface 41 of the downstream-side guide member 40 is formed to have a curved shape such that a length of the downstream-side guide member 40 along the radial direction D of the rotor 2 becomes smaller toward an upstream side in the direction of the axis X and is recessed toward the cavity 7.

With the above configuration, with the upstream side surface 41 of the downstream-side guide member 40, it is possible to guide the working fluid deviated from the main flow passage M toward the upstream side of the axis X toward the outer side in the radial direction D. That is, it is possible to guide the swirl flow S to flow in spiral about the circumferential direction P of the rotor 2, and thus it is possible to assist the swirl brake 30 of the present disclosure to be perpendicular to at least a part of the swirl flow S, and suppress the swirl flow S effectively.

In some embodiments, at the upstream side of the downstream-side guide member 40, the swirl brake 30 may further include an upstream-side guide member 50 having an annular shape and extending toward the outer side in the radial direction D of the rotor 2 from the rotor 2 (see FIG. 10B).

The downstream side surface 51 of the upstream-side guide member 50 may be formed to have a curved shape such that a length of the upstream-side guide member 50 along the radial direction D of the rotor 2 becomes smaller toward the downstream side in the direction of the axis X and is recessed toward the cavity 7.

With the above configuration, with the downstream side surface 51 of the upstream-side guide member 50, it is possible to guide the working fluid that is guided to the upstream side surface of the seal fin 14 and the outer periphery of the rotor 2 from the main flow passage M and introduced to the upstream side of the axis X, to the outer side of the radial direction D toward the upstream side of the axis X. That is, it is possible to guide the swirl flow S to flow in spiral about the circumferential direction P of the rotor 2, and thus it is possible to assist the swirl brake 30 of the present disclosure to be perpendicular to at least a part of the swirl flow S, and suppress the swirl flow S effectively.

FIG. 11A is a side cross-sectional view of a working fluid inside a cavity according to an embodiment. FIG. 11B is a side view showing an arrangement of a swirl brake according to an embodiment.

In some embodiments, at the upstream side of the seal fin 14, the swirl brake 30 may further include a stator-side guide member 60 having an annular shape and extending toward the inner side in the radial direction D of the rotor 2 from the radially-inner side stator vane ring 12 (see FIG. 11B).

The upstream side surface 41 of the stator-side guide member 60 may be formed to have a root side surface 61 extending along the radial direction D of the rotor 2, and a tip side surface 62 connected to the inner side of the root side surface 61 with respect to the radial direction D. The tip side surface 62 has a curved shape such that a length of the stator-side guide member 60 along the radial direction D of the rotor 2 becomes smaller toward the upstream side in the direction of the axis X and is recessed toward the cavity 7.

With the above configuration, with the tip side surface 62 having a curved shape disposed on the stator-side guide member 60, it is possible to cause the working fluid arriving at the inner side of the radial direction D from the inner periphery of the radially-inner side stator vane ring 12 after deviating from the main flow passage M to flow toward the inner periphery of the radially-inner side stator vane ring 12 at the upstream side of the seal fin 14, and thereby it is possible to generate a small swirl efficiently. Accordingly, for the working fluid flowing toward the downstream side of the axis X through the gap between the seal fin 14 and the radially-inner side stator vane ring 12, it is possible to reduce leakage, and maintain or improve the seal function.

In some embodiments, at the upstream side of the stator-side guide member 60, the swirl brake 30 may further include a rotor-side guide member 70 having an annular shape and extending toward the outer side in the radial direction D of the rotor 2 from the outer peripheral surface 2A of the rotor 2 (see FIG. 11B).

The downstream side surface 71 of the rotor-side guide member 70 may be formed to have a curved shape such that a length of the rotor-side guide member along the radial direction D of the rotor 2 becomes smaller toward the downstream side in the direction of the axis X and is recessed toward the tip side surface 62 of the stator-side guide member 60.

With the above configuration, with the rotor-side guide member 70, it is possible to cause the working fluid arriving at the inner side of radial direction D along the upstream side surface of the radially-inner side stator vane ring 12 after deviating from the main flow passage M to flow in spiral toward the inner periphery of the radially-inner side stator vane ring 12 at the upstream side of the seal fin 14, and thereby it is possible to generate a swirl just before the clearance efficiently. Accordingly, by applying a contraction effect to the flow of the working fluid flowing toward the downstream side of the axis X through the gap between the seal fin 14 and the rotor 2, it is possible to reduce leakage, and maintain or improve the seal function.

Furthermore, in some embodiments, the swirl brake 30 may include a cut-out portion 30D having a curved surface recessed toward the radially-inner side stator vane ring 12 from the radially outer end 30B of the swirl brake 30 to the downstream-side end 30C of the swirl brake 30, in a cross-sectional view including the axis X (see FIG. 11B). A plurality of cut-out portions 30D may be arranged at intervals along the circumferential direction P with the swirl brake 30, or in an annular shape along the circumferential direction P. Accordingly, it is possible to cause the working fluid to flow in spiral toward the inner periphery of the radially-inner side stator vane ring 12 at the upstream side of the seal fin 14 and generate a swirl efficiently, whereby it is possible to maintain or improve the seal function as described above.

According to at least some embodiments of the present disclosure, it is possible to prevent or suppress the swirl flow in the axial flow rotating machinery 1.

Embodiments of the present invention were described in detail above, but the present invention is not limited thereto, and various amendments and modifications may be implemented.

REFERENCE SIGNS LIST

1 Axial flow rotating machinery (axial flow turbine)
2 Rotor
3 Casing
3A Casing body
3B Support body
4 Nozzle structure body
6, 7 Cavity
8 Seal portion
10 Stator vane stage
11 Stator vane
11A Radially-inner end
12 Radially-inner side stator vane ring
13 Stator-vane side seal device
14 Seal fin
20 Rotating blade stage
21 Rotating blade
21A Radially outer end
22 Radially-outer side rotating blade ring
22A Outer peripheral surface
23 Rotating-blade side seal device
24 Seal fin
30 Swirl brake
30A Plate member
31 First plate-shaped member
31A Leading edge
31B Trailing edge
31C Inner end
32 Second plate-shaped member
32A First bending portion
33 Third plate-shaped member
33A Second bending portion
40 Downstream-side guide member
41 Upstream side surface
50 Upstream-side guide member
51 Downstream side surface
60 Stator-side guide member
61 Root side surface
62 Tip side surface
70 Rotor-side guide member
71 Downstream side surface
M Main flow passage
S Swirl flow
X Axial direction
R Rotational direction
D Radial direction
P Circumferential direction

The invention claimed is:

1. An axial flow rotating machinery, comprising:
a rotor configured to rotate about an axis;
a casing accommodating the rotor so as to be rotatable;
a rotating-blade stage including rotating blades fixed to the rotor at intervals in a circumferential direction and a radially-outer side rotating blade ring continuing to radially outer ends of the rotating blades; and
a rotating-blade side seal device configured to seal a gap between the radially-outer side rotating blade ring and the casing,
wherein the rotating-blade side seal device includes:
a seal fin having an annular shape and extending toward an outer peripheral surface of the radially-outer side rotating blade ring from the casing; and
a swirl brake fixed to the casing in a cavity formed at an upstream side of the seal fin, and
wherein the swirl brake includes:
a first plate-shaped member having a surface along a radial direction of the rotor, the first plate-shaped member extending along the axis or extending in a direction which interests with the axis such that a leading edge of the first plate-shaped member is positioned upstream of a trailing edge of the first plate-shaped member in a rotational direction of the rotor; and
a second plate-shaped member or a third plate-shaped member having a surface oblique to the radial direction of the rotor, the second plate-shaped member extending from an inner end of the first plate-shaped member toward a downstream side in the rotational direction of the rotor and the third plate-shaped member extending from the inner end of the first plate-shaped member toward an upstream side in the rotational direction of the rotor.

2. The axial flow rotating machinery according to claim 1, wherein an intersection angle between an extension direction of the first plate-shaped member and the axis is not smaller than 30 angular degrees and not greater than 60 angular degrees.

3. The axial flow rotating machinery according to claim 1, wherein the first plate-shaped member extends along the axis.

4. The axial flow rotating machinery according to claim 1, wherein the swirl brake includes the first plate-shaped member, the second plate-shaped member, and the third plate-shaped member disposed at an upstream side of the second plate-shaped member.

5. The axial flow rotating machinery according to claim 4, wherein the swirl brake includes a single plate member,
wherein the second plate-shaped member and the third plate-shaped member are configured to be capable of bending with respect to the first plate-shaped member independently from one another, and
wherein, on the inner end of the first plate-shaped member, a first bending portion which causes the second plate-shaped member to extend toward the downstream side in the rotational direction of the rotor and a second bending portion which causes the third plate-shaped member toward the upstream side in the rotational direction of the rotor are formed.

6. The axial flow rotating machinery according to claim 4, wherein the second plate-shaped member is formed so as to extend such that a distance from the inner end of the first plate-shaped member toward the downstream side in the rotational direction of the rotor becomes longer toward a downstream side in an axial direction, and
wherein the third plate-shaped member is formed so as to extend such that a distance from the inner end of the first plate-shaped member toward the upstream side in the rotational direction of the rotor becomes longer toward an upstream side in the axial direction.

7. The axial flow rotating machinery according to claim 1, further comprising:
a downstream-side guide member having an annular shape and extending toward an inner side in the radial direction of the rotor from the casing at an upstream side of the seal fin,
wherein an upstream side surface of the downstream-side guide member is formed to have a curved shape such that a length of the downstream-side guide member along the radial direction of the rotor becomes smaller toward an upstream side in an axial direction and is recessed toward the cavity.

8. The axial flow rotating machinery according to claim 7, further comprising:
an upstream-side guide member having an annular shape and extending toward the inner side in the radial direction of the rotor from the casing at an upstream side of the downstream-side guide member,
wherein a downstream side surface of the upstream-side guide member is formed to have a curved shape such that a length of the upstream-side guide member along the radial direction of the rotor becomes smaller toward a downstream side in the axial direction and is recessed toward the cavity.

9. The axial flow rotating machinery according to claim 1, further comprising:
a stator-side guide member having an annular shape and extending toward an inner side in the radial direction of the rotor from the casing at an upstream side of the seal fin,
wherein an upstream side surface of the stator-side guide member is formed to have:
a root side surface extending along the radial direction of the rotor; and
a tip side surface connected to an inner side of the root side surface with respect to the radial direction, the tip side surface having a curved shape such that a length of the stator-side guide member along the radial direction of the rotor becomes smaller toward an upstream side in an axial direction and is recessed toward the cavity.

10. The axial flow rotating machinery according to claim 9, further comprising:
a rotor-side guide member having an annular shape and extending toward an outer side in the radial direction of the rotor from the outer peripheral surface of the radially-outer side rotating blade ring at an upstream side of the stator-side guide member,
wherein a downstream side surface of the rotor-side guide member is formed to have a curved shape such that a length of the rotor-side guide member along the radial direction of the rotor becomes smaller toward a downstream side in the axial direction and is recessed toward the tip side surface of the stator-side guide member.

11. An axial flow rotating machinery, comprising:
a rotor configured to rotate about an axis;
a casing accommodating the rotor so as to be rotatable;
a stator-vane stage including stator vanes fixed to the casing at intervals in a circumferential direction and a radially-inner side stator vane ring continuing to radially inner ends of the stator vanes; and
a stator-vane side seal device configured to seal a gap between the radially-inner side stator vane ring and the rotor,
wherein the stator-vane side seal device includes:
a seal fin having an annular shape and extending from an inner peripheral surface of the radially-inner side stator vane ring toward the rotor; and
a swirl brake fixed to the radially-inner side stator vane ring at an upstream side of the seal fin, and
wherein the swirl brake includes:
a first plate-shaped member having a surface along a radial direction of the rotor, the first plate-shaped member extending along the axis or extending in a direction which interests with the axis such that a leading edge of the first plate-shaped member is positioned upstream of a trailing edge of the first plate-shaped member in a rotational direction of the rotor; and
a second plate-shaped member or a third plate-shaped member having a surface oblique to the radial direction of the rotor, the second plate-shaped member extending from an inner end of the first plate-shaped member toward a downstream side in the rotational direction of the rotor and the third plate-shaped member extending from the inner end of the first plate-shaped member toward an upstream side in the rotational direction of the rotor.

* * * * *